United States Patent
Yoneyama et al.

(10) Patent No.: US 6,219,181 B1
(45) Date of Patent: Apr. 17, 2001

(54) MONITOR-AIDED MICROSCOPE

(75) Inventors: Takashi Yoneyama, Hachioji; Takashi Nagano, Tokyo; Hideaki Endo; Atsuhiro Tsuchiya, both of Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/090,631

(22) Filed: Jun. 4, 1998

(30) Foreign Application Priority Data

Jun. 9, 1997 (JP) .................................................. 9-150724

(51) Int. Cl.[7] ............................. G02B 21/06; G02B 21/00
(52) U.S. Cl. ........................ 359/389; 359/368; 359/385; 359/388
(58) Field of Search .................................... 359/368–390, 359/422, 423, 432–433, 654–661

(56) References Cited

U.S. PATENT DOCUMENTS

| 3,782,823 | * | 1/1974 | Kantorski et al. | 359/389 |
| 4,136,927 | * | 1/1979 | Lisfeld | 359/388 |
| 4,756,611 | * | 7/1988 | Yonekubo et al. | 359/388 |
| 4,769,698 | * | 9/1988 | Ledley et al. | 359/381 |
| 4,784,481 | * | 11/1988 | Wuerfel | 359/385 |
| 5,000,555 | * | 3/1991 | Sato | 359/392 |
| 5,006,872 | * | 4/1991 | Parker | 359/363 |
| 5,684,627 | * | 11/1997 | Ganser et al. | 359/368 |

FOREIGN PATENT DOCUMENTS

| 48-75652 | | 9/1973 | (JP) . | |
| 63-131115 | * | 6/1988 | (JP) | 359/380 |
| 1-167817 | * | 7/1989 | (JP) | 359/391 |
| 4-213404 | * | 8/1992 | (JP) | 359/385 |
| 5-34601 | | 2/1993 | (JP) . | |
| 5-127087 | | 5/1993 | (JP) . | |
| 7-199077 | | 8/1995 | (JP) . | |

* cited by examiner

Primary Examiner—Thong Nguyen
(74) Attorney, Agent, or Firm—Frishauf, Holtz, Goodman, Langer & Chick, P.C.

(57) ABSTRACT

A microscope includes a stage on which a specimen is placed, a light source for illuminating the specimen, an objective lens for passing an illumination light from the specimen, an image formation system for forming an optical image of the specimen, a monitor for displaying as a visible picture the optical image of the specimen obtained from the image formation system, and an observation condition switch for switching the observation condition for the specimen from one to another. In particular, the optical axis extending from the light source to the image formation system is horizontal over the floor and various controls constituting the observation condition switch are mounted intensively on one side of a main body of the microscope.

19 Claims, 16 Drawing Sheets

MONITOR-AIDED MICROSCOPE

BACKGROUND OF THE INVENTION

The present invention relates to a monitor-aided microscope suited for viewing through a monitor.

A technique is known for inspecting a specimen, not shown but placed on a stage 052, by an observer viewing a conventional microscope 050 which includes an eye-piece lens 051, the stage 052, and a revolver 053 with no use of a motor, as shown in FIG. 1.

Another technique for inspecting with a microscope aided with a monitor but not an eye-piece lens.

The latter is more preferable than the former permitting the observer to view through the eye-piece lens because it has the following advantages and has widely been used.

(1) The observer when viewing has more freedom in the posture and will suffer from less fatigue and thus enjoy the efficiency of working.

(2) Small flaws which are hardly viewed by the eyes can be detected by processing of data e.g. of an infrared ray or ultraviolet ray image.

(3) The latter allows two or more observers to view and inspect at one time, hence speeding the transmission of information.

The advantages depicted in the paragraphs (1) and (2) are more emphasized in a type of the monitor viewing for inspecting wafers or cells with the use of a screener.

Various types of the monitor viewing have been invented and filed for application.

For example, Jpn. Pat. Appln. KOKAI Publication No. 5-127087 discloses a monitor-aided microscope permitting a subject of interest to be enlarged by a microscope and viewed on the screen of a monitor. Also, another monitor-aided microscope is disclosed in Jpn. Pat. Appln. KOKAI Publication No. 7-199077 for improving the operability in monitor viewing.

However, the monitor-aided microscope disclosed in Jpn. Pat. Appln. KOKAI Publication No. 5-127087 is unfavorable for operating the microscope while viewing the monitor.

FIGS. 2A and 2B illustrate such an action. FIG. 2A shows a microscope body 020 accompanied with a camera 021 and a monitor 030 both placed horizontally on a floor 040. FIG. 2B shows a microscope body 020 and a monitor 030 placed vertically on a floor 040.

In the monitor-aided microscopes shown in FIGS. 2A and 2B, a procedure of steps for operating the microscope body while viewing the monitor includes:

(1) setting a specimen on a stage;

(2) determining a rate of magnification on an objective lens;

(3) controlling a filter, a field of view, and a size of aperture in relation to the objective lens;

(4) viewing the monitor;

(5) adjusting the stage so that the specimen is correctly focused on the monitor; and (6) positioning the specimen to a desired location for observation.

The above procedure is conducted in a routine manner. More specifically, the observer has to face the microscope for mechanical control and shift his or her eyes to the monitor screen for viewing the specimen as denoted by the dotted lines. Depending on the positional relationship between the microscope body and the monitor, the face of the observer is turned vertically or horizontally to change the direction of vision. This will hardly achieve improvement of the working efficiency or the initial purpose through minimizing the fatigue of the observer.

Also, while the observer who is skilled operating the microscope body without his or her eyes directing to it, he or she has to extend the arms to both sides and bring up the face to view the monitor from their original position in front of the monitor.

In Jpn. Pat. Appln. KOKAI Publication No. 7-199077, the operability on the microscope body is improved by having a group of controls to be operated by the observer driven electrically and particularly providing a control unit for the observer carrying out a centered controlling action. The powered and centered control will however increase the overall dimensions and also the cost of production.

BRIEF SUMMARY OF THE INVENTION

Accordingly, it is an object of the present invention to provide an improved monitor-aided microscope which is facilitated in the viewing and the operation and increased in the space saving while giving no cost-up.

According to a first aspect of the present invention, there is provided a microscope comprising: a stage on which a specimen is placed; a light source for illuminating the specimen; an objective lens for passing an illumination light from the specimen; an image formation system for forming an optical image of the specimen; a monitor for displaying as a visible picture the optical image of the specimen obtained from the image formation system; and an observation condition switching means for switching the observation condition for the specimen from one to another, wherein the optical axis extending from the light source to the image formation system is horizontal over the floor and various controls constituting the observation condition switching means are mounted intensively on one side of a main body of the microscope. This allows the main body of the microscope to be decreased in the overall height so that the monitor is placed on an upper or rear side of the main body or its adjacent location. The observer can hence operate the microscope while viewing the monitor without shifting the direction of the eyes.

In the microscope, its frame may be used as a monitor mounting table on which the monitor is placed. This improves the space saving and decreases the cost of the microscope.

In the microscope, the controls in the observation condition switching means may be a focusing handle for focusing the specimen.

The microscope may further comprise a stage operating knob mounted to the one side of the main body of the microscope for moving the stage forward, backward, upper and lower.

In the microscope, the observation condition switching means may switch between a first mode for high magnification observation of the specimen with the objective lens and a second mode for low magnification observation with no use of the objective lens.

According to a second aspect of the present invention, there is provided a microscope comprising:

a stage on which a specimen is placed; a light source for illuminating the specimen; an objective lens for passing an illumination light from the specimen;

an image formation system for forming an optical image of the specimen; a monitor for displaying as a visible picture the optical image of the specimen obtained from the image formation system; and an observation condition switching means for switching the observation condition for the specimen from one to another, wherein the observation condition switching means switches between a first mode for high magnification observation of the specimen with the objective lens and a second mode for low magnification observation with no use of the objective lens. This allows both the high magnification observation and the low magnification or macroimage observation to be carried out in one single assembly of the microscope, hence requiring no need of an extra macroimage observation device. Since the field of view become wider than that of a conventional low magnification objective lens, the specimen of a considerable size can successfully be viewed throughout its size. Consequently, the target to be observed at a higher magnification can easily be identified in the entirety of the specimen.

In the microscope, the objective lens when the second mode is selected may be retracted from the optical path so that the optical image of the specimen is transmitted to the image formation system along an optical path which is different from that of the first mode.

In the microscope, the objective lens may be mounted on a revolver which is retracted from the optical path when the second mode is selected.

In the microscope, the objective lens may be mounted on a revolver which has a specific aperture provided therein and, when the second mode is selected, the revolver is rotated so that the optical path extends across its aperture. Preferably, the aperture of the revolver is greater in size than objective lens mounting apertures.

In the microscope, the objective lens when the second mode is selected may be retracted from the optical path while a corresponding focusing lens is moved to and set across the optical path.

In the microscope, the objective lens when the second mode is selected may be retracted from the optical path while a corresponding focusing lens through which the optical image of the specimen is passed is moved and set. Preferably, the focusing lens is moved along the optical axis.

In the microscope, the stage when the second mode is selected may be moved until the specimen is located across an optical path which is different from that of the first mode.

According to a third aspect of the present invention, there is provided a microscope comprising: a stage on which a specimen is placed; a light source for illuminating the specimen; an objective lens for passing an illumination light from the specimen; an image formation system for forming an optical image of the specimen; a monitor for displaying as a visible picture the optical image of the specimen obtained from the image formation system; and an observation condition switching means for switching the observation condition for the specimen from one to another, wherein the observation condition switching means switches between a first mode for high magnification observation of the specimen with the objective lens and a second mode for low magnification observation with no use of the objective lens, and the monitor is arranged for displaying simultaneously a macroimage produced in the first mode and a microimage produced in the second mode on its screen. This allows the macroimage and the microimage to be displayed at the same time on the monitor. Consequently, the observer can identify an enlarged part of the specimen, its location in the specimen, and the current data of the microscope specifications on the same screen of the monitor.

In the microscope, a blank which represents the location and size of the microimage within the entirety of the macroimage may be displayed in the macroimage. This permits the observer to identify the location and size of the target in the entirety of the specimen.

In the microscope, the image to be observed may be displayed on the screen of the monitor together with a data indicative of the observation condition. This allows the observer to identify the observation condition such as a data of the objective lens magnification through viewing the screen of the monitor without examining the other components of the microscope. Accordingly, setting error on the optical elements will be minimized and the fatigue during the working time will be relieved.

In the microscope, the image to be observed may be displayed on the screen of the monitor together with corresponding images produced and recorded in the past. Since a change with time of the specimen is observed with much ease, physical replacement of the specimen with another for comparison will be eliminated and highly efficient comparison between the specimens will be possible.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

Figure 10:
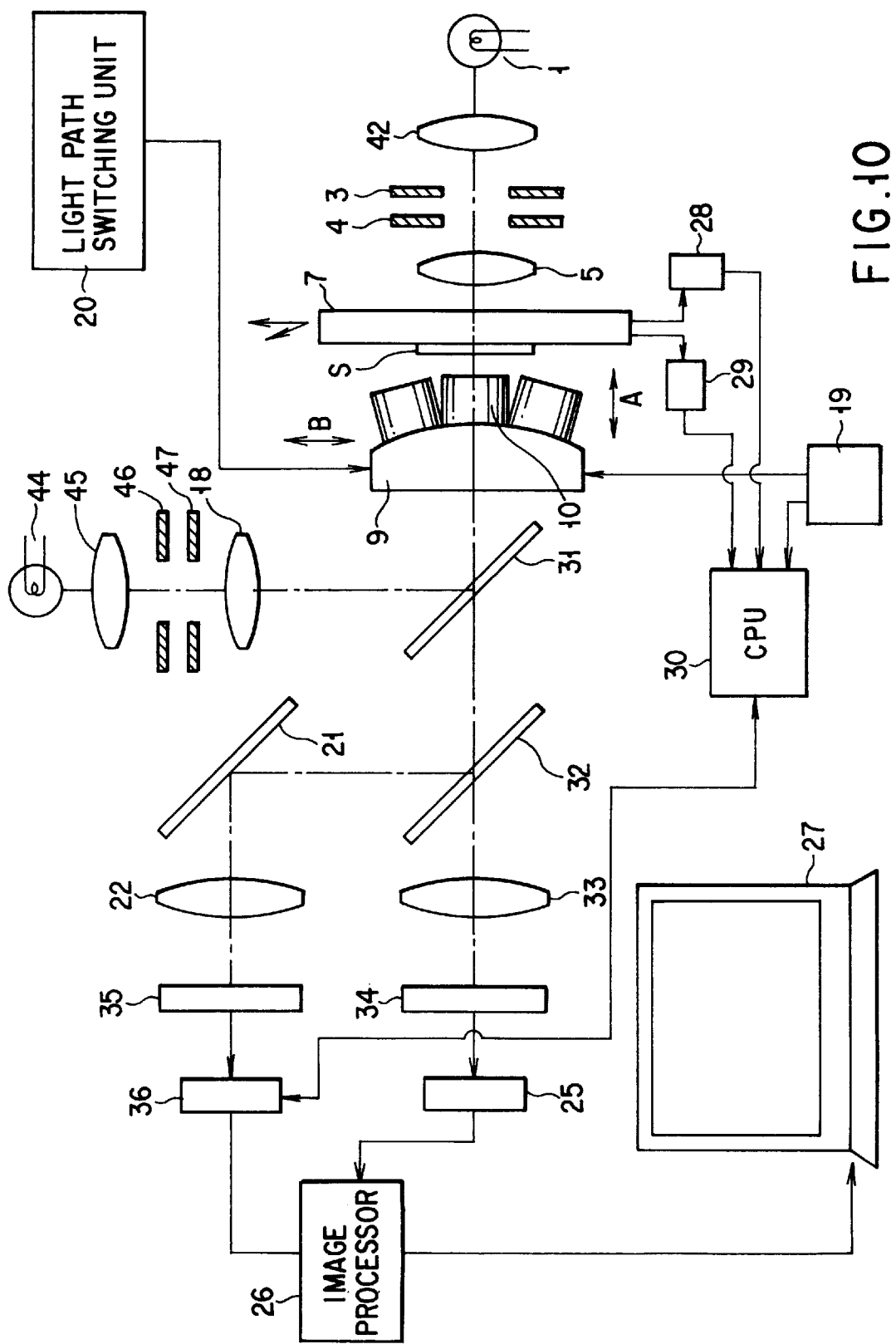
FIG. 10 is a schematic view of the monitor-aided microscope of the third embodiment.
Figure 11:
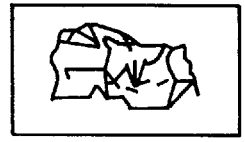
FIG. 11 is an explanatory view showing an advantageous action on the monitor-aided microscope shown in FIG. 10 wherein a macroimage generated by the microscope is photoelectrically converted and saved as a still image.
Figure 12:
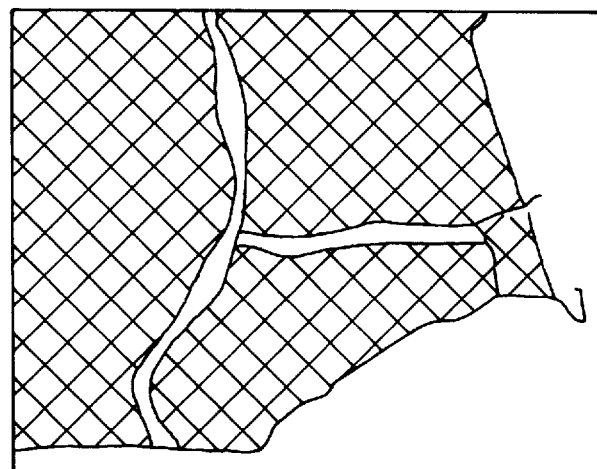
Figure 13:
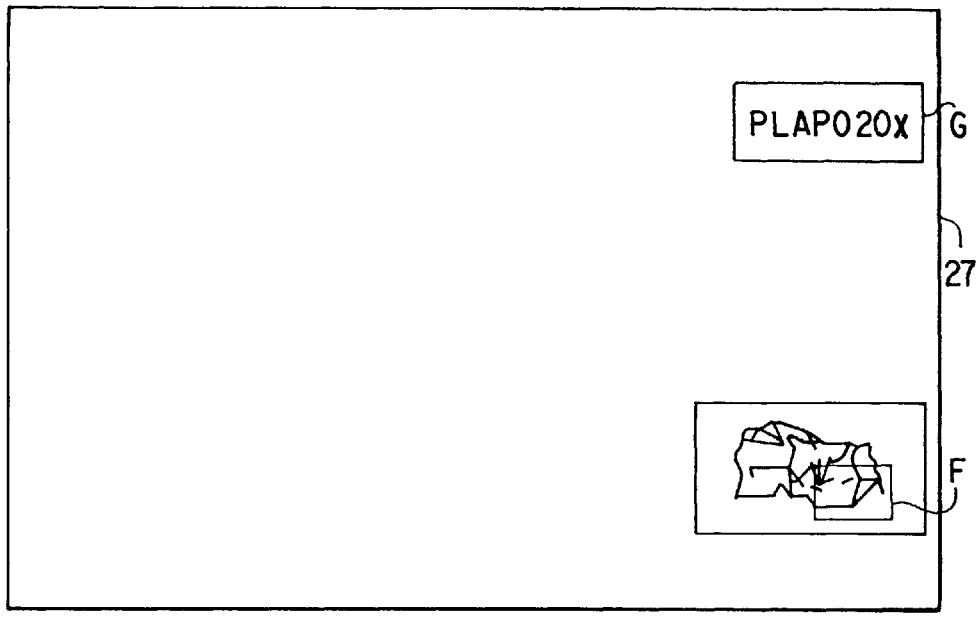
Figure 14:
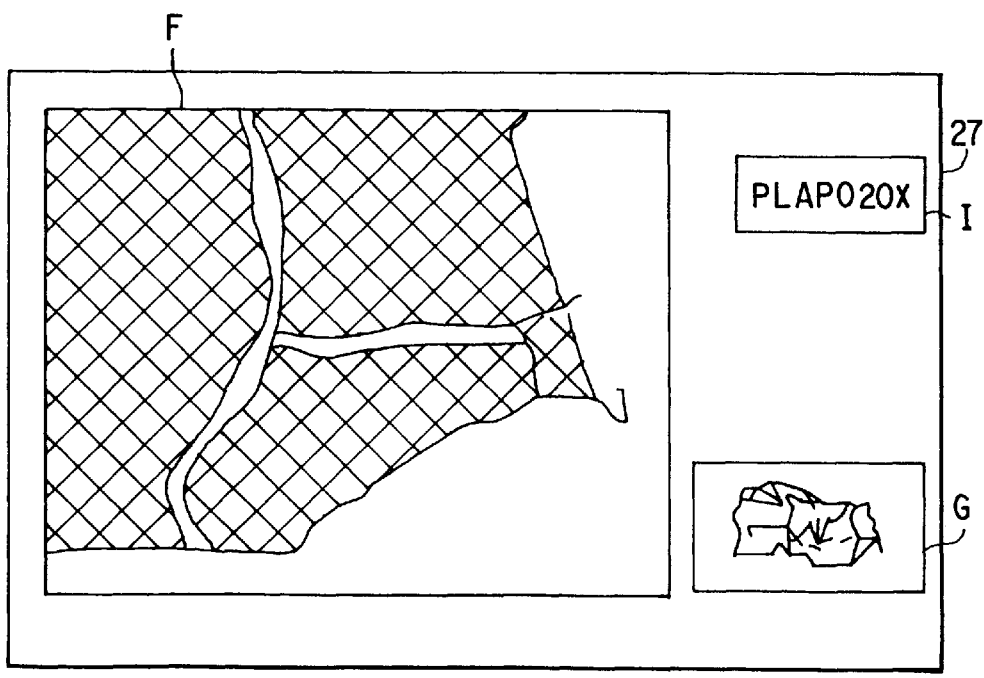
Figure 15:
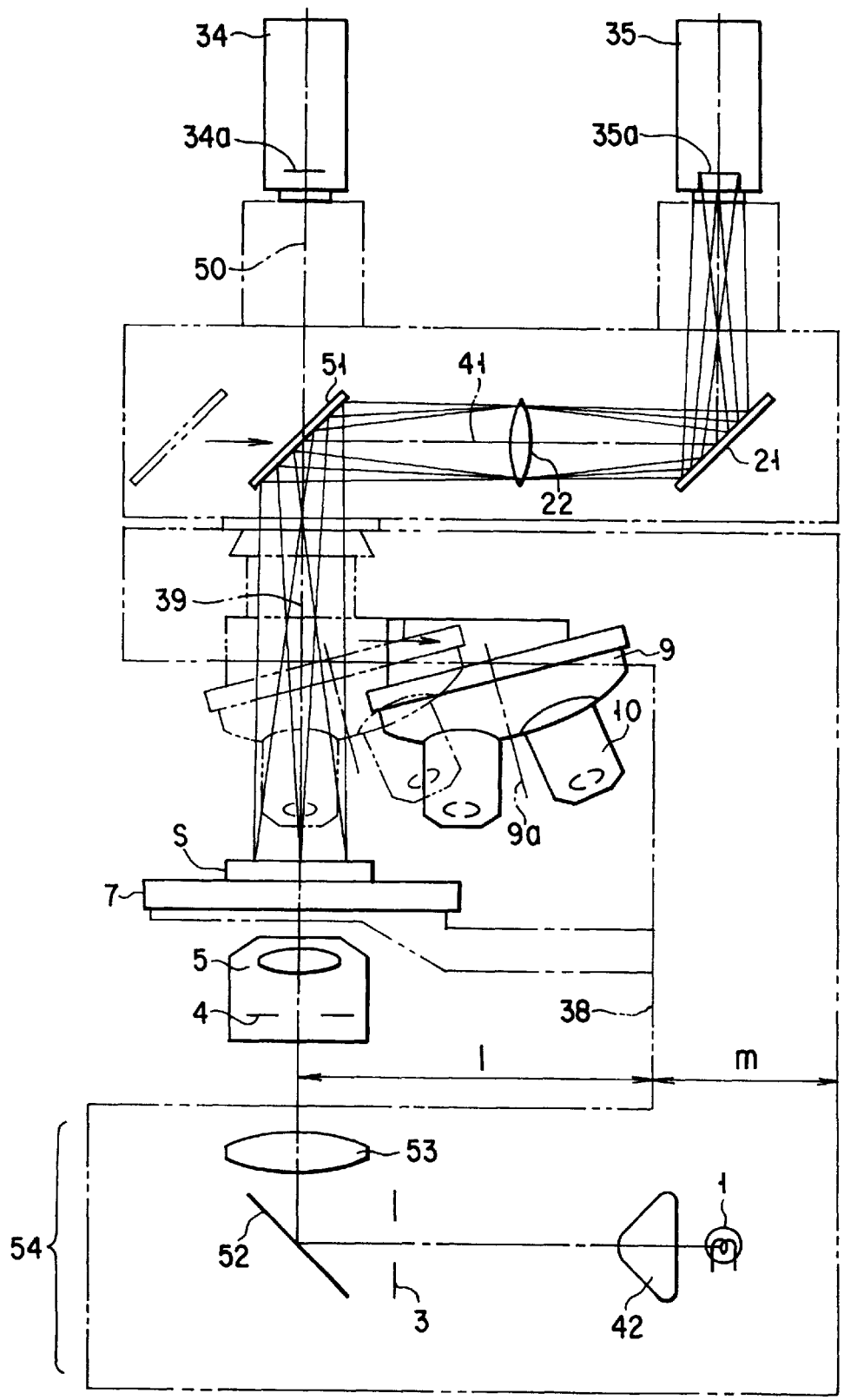
Figure 16:
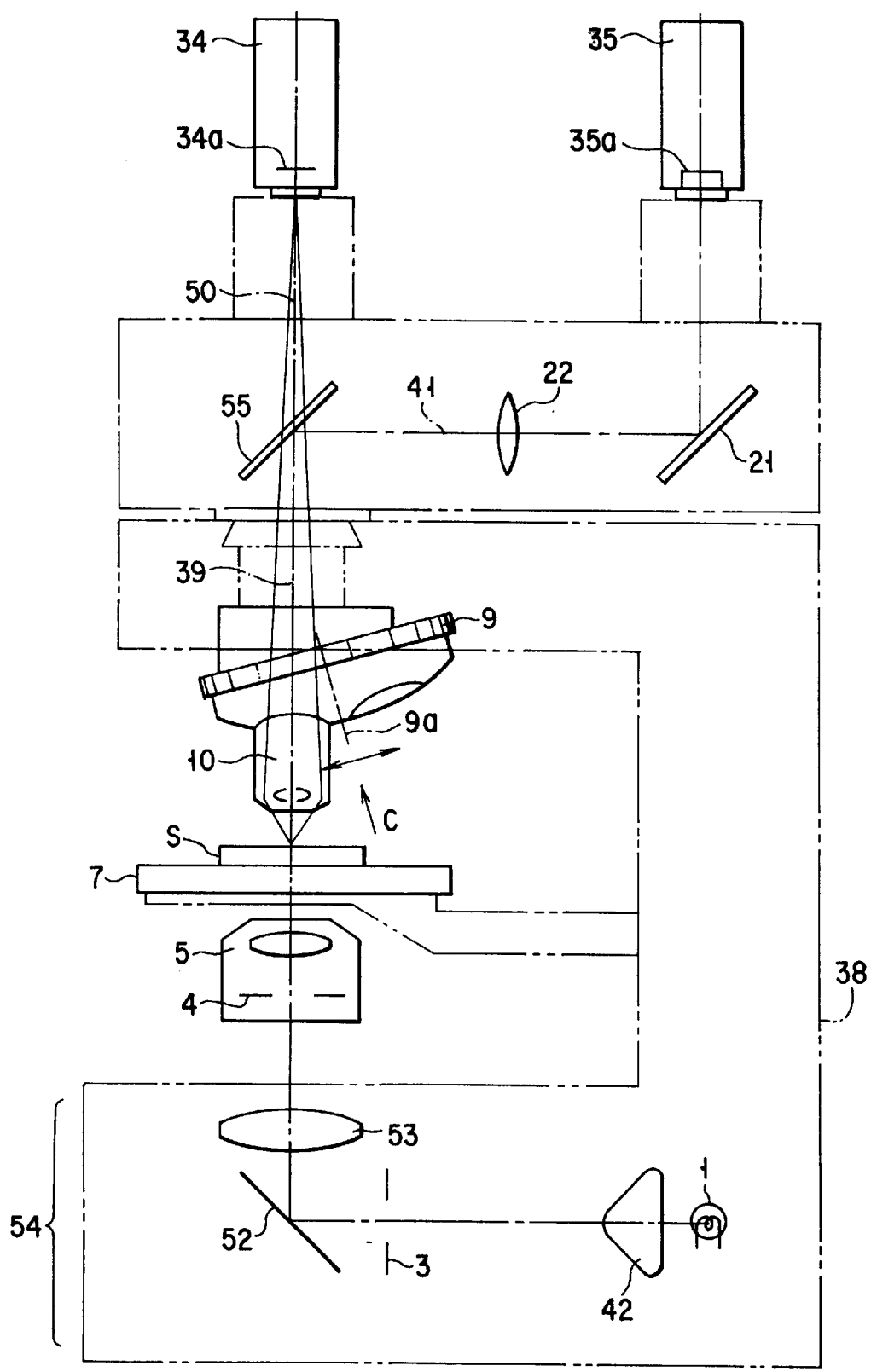
Figure 17:
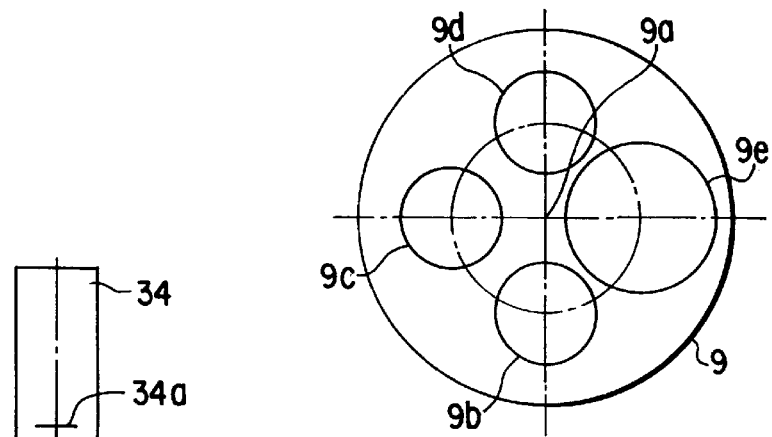
Figure 18:
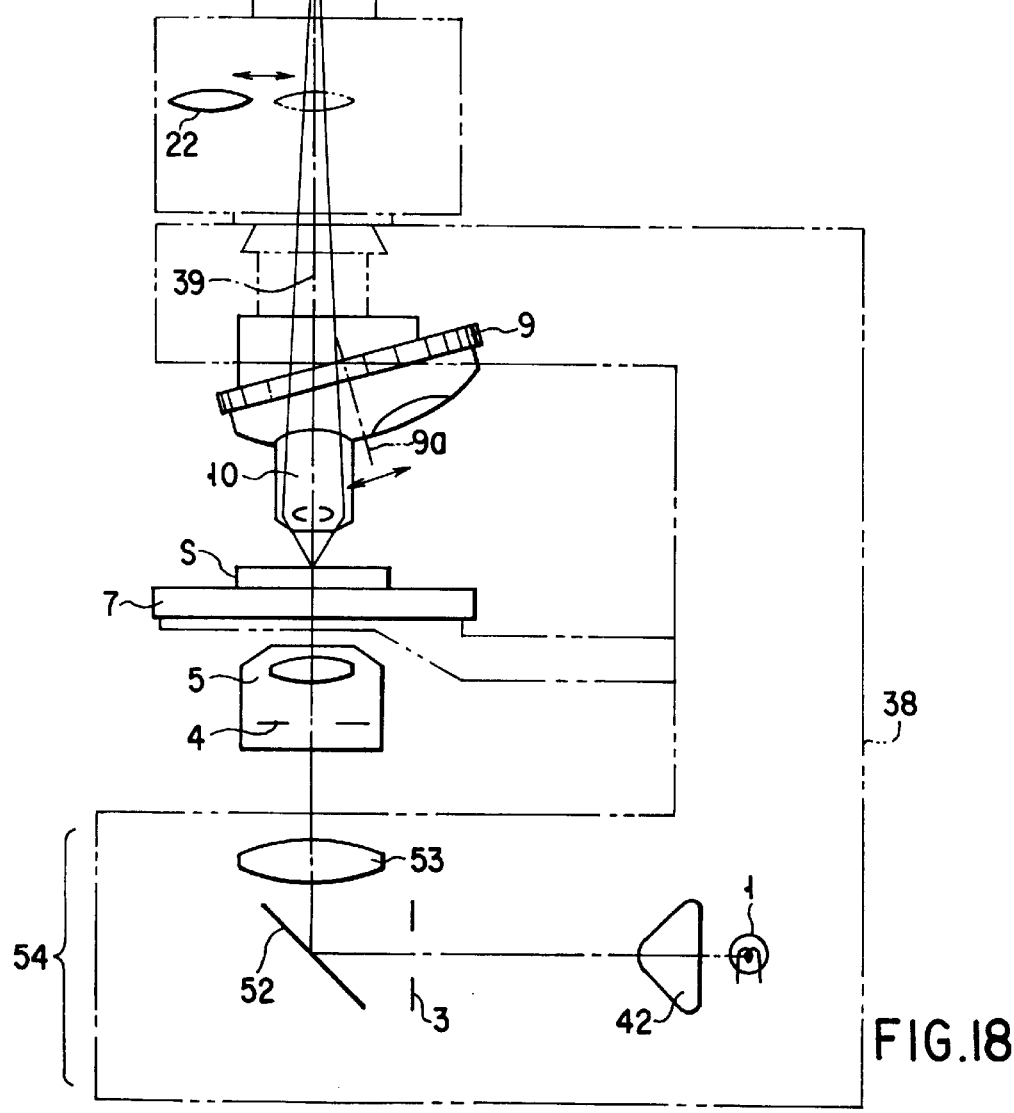
Figure 19:
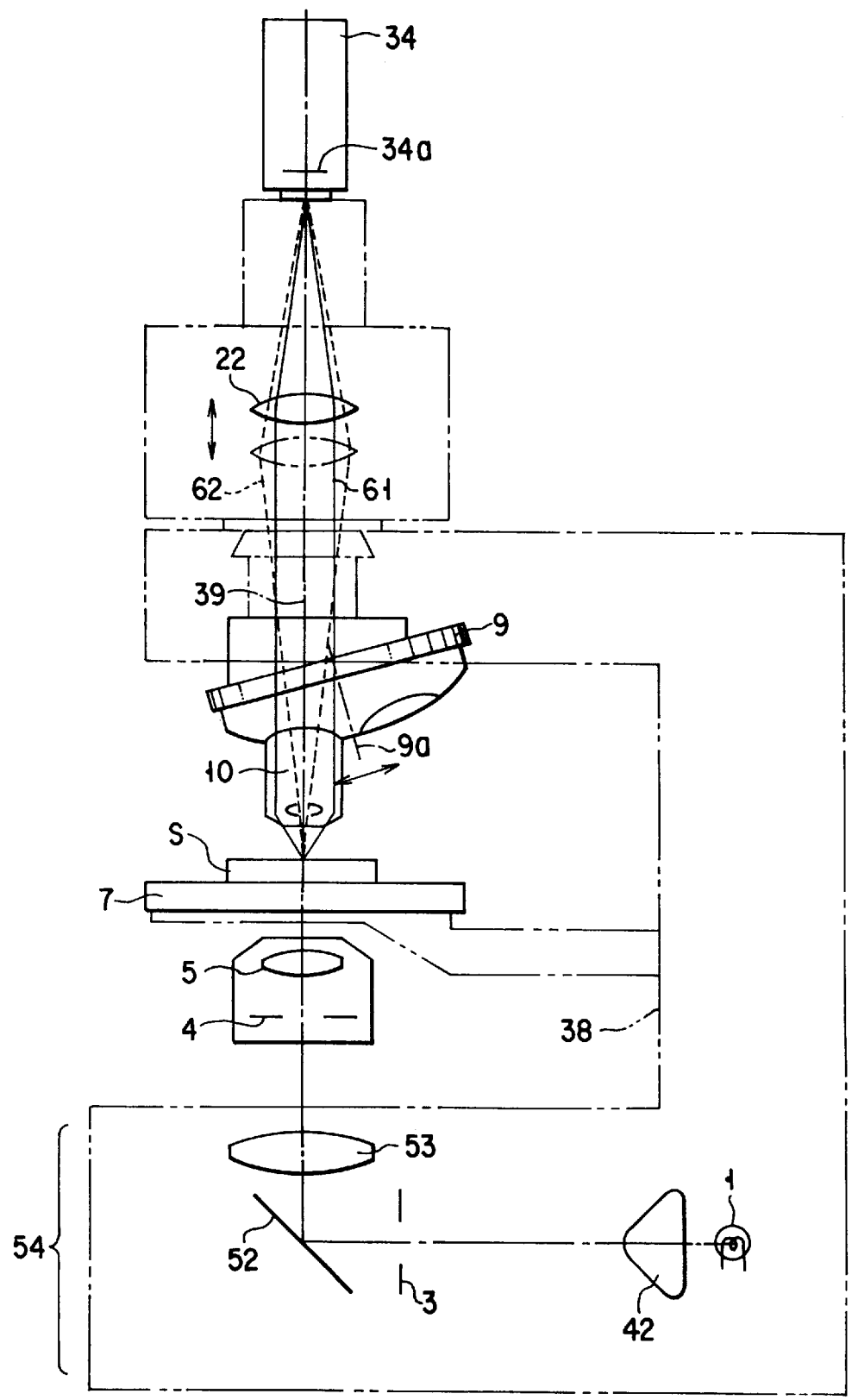
Figure 20:
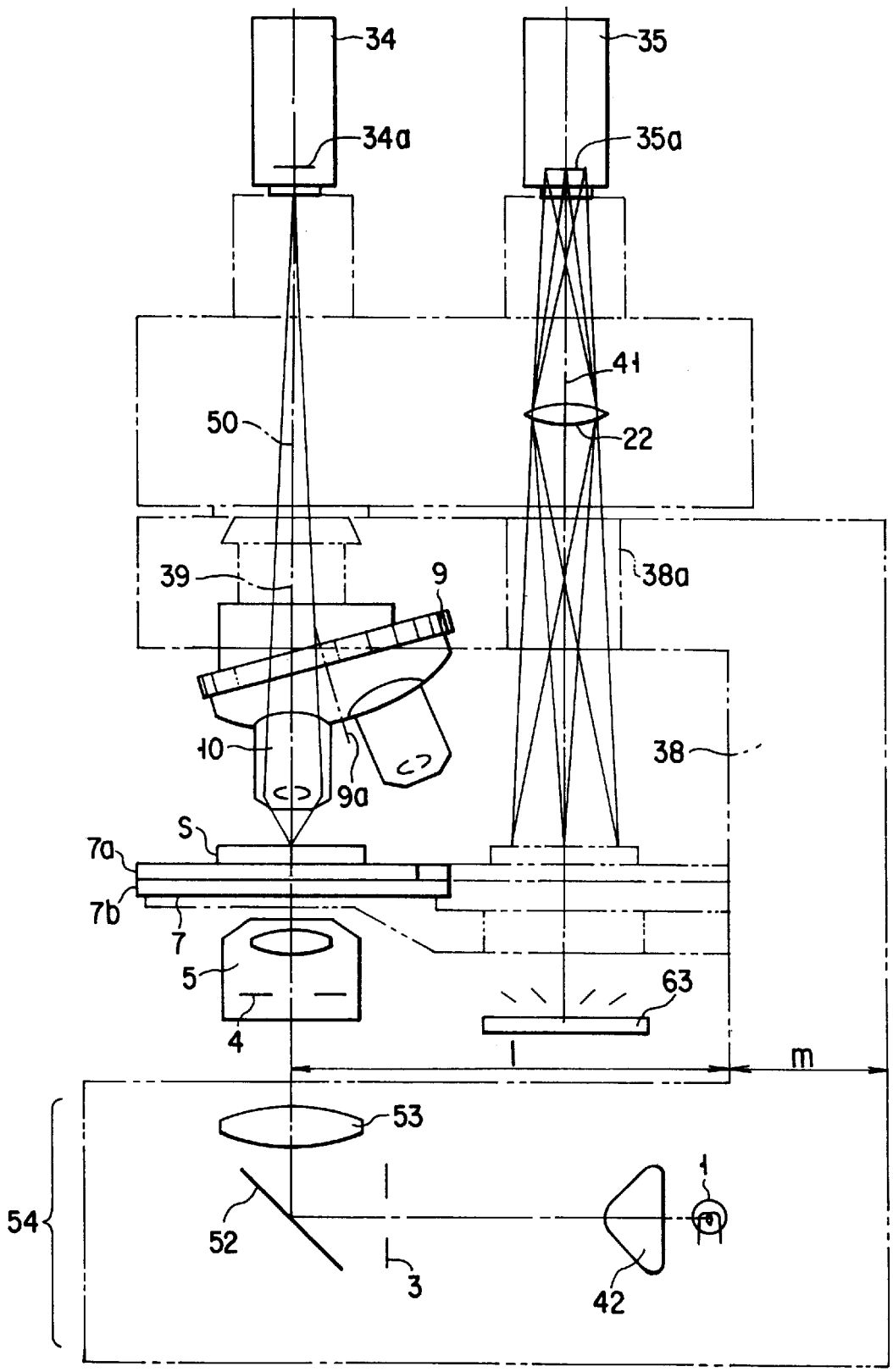
Figure 21:
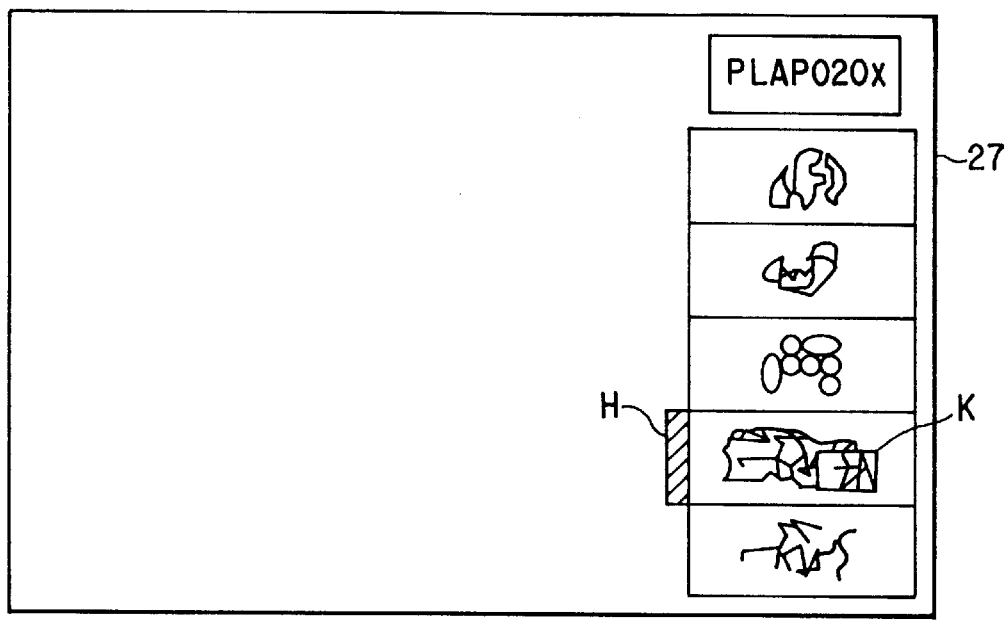
Figure 22:
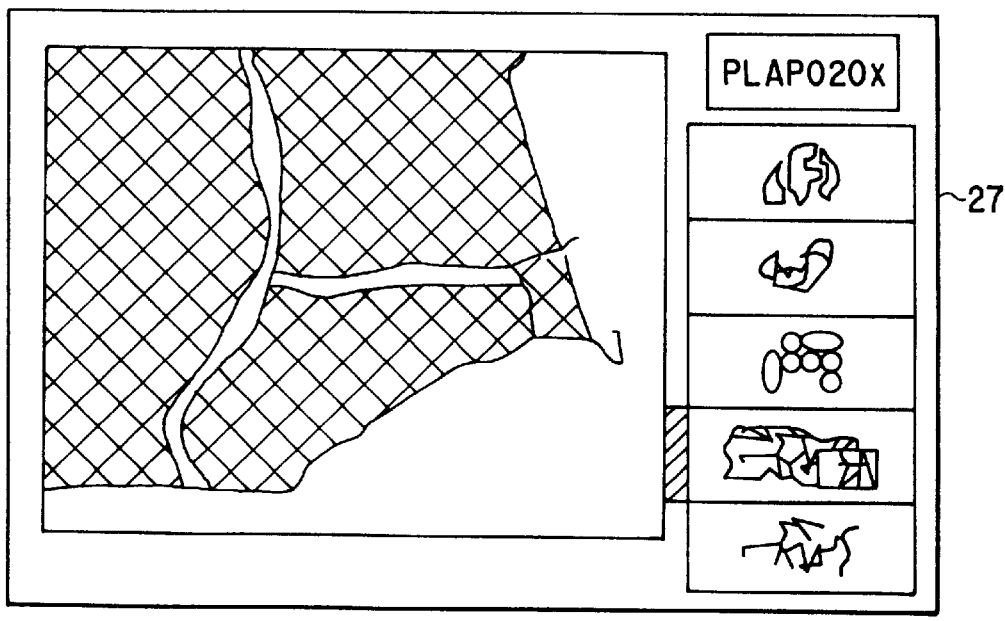

FIG. 12 is an explanatory view showing the advantageous action on the monitor-aided microscope shown in FIG. 10 wherein a photo-to-electric conversion signal from the microscope is temporarily saved as image data;

FIG. 13 is an explanatory view showing the advantageous action on the monitor-aided microscope shown in FIG. 10 wherein a real-time image of the current target of observation is combined with the macroimage of FIG. 11;

FIG. 14 is an explanatory view showing the advantageous action on the monitor-aided microscope shown in FIG. 10 wherein a combined image is shown which includes a real-time image, a macroimage and the magnification of the objective lens;

FIG. 15 is a schematic view of a construction of a monitor-aided microscope according to a fourth embodiment of the present invention;

FIG. 16 is a schematic view of a construction of a monitor-aided microscope according to a fifth embodiment of the present invention;

FIG. 17 is an explanatory view showing an advantageous action on the monitor-aided microscope shown in FIG. 16;

FIG. 18 is a schematic view of a construction of a monitor-aided microscope according to a sixth embodiment of the present invention;

FIG. 19 is a schematic view of a construction of a monitor-aided microscope according to a seventh embodiment of the present invention;

FIG. 20 is a schematic view of a construction of a monitor-aided microscope according to an eighth embodiment of the present invention;

FIG. 21 illustrates a display on a monitor of a monitor-aided microscope according to a tenth embodiment of the present invention; and FIG. 22 illustrates a display on the monitor of the monitor-aided microscope of the tenth embodiment.

DETAILED DESCRIPTION OF THE INVENTION

Embodiments of the present invention will now be described with referring to the accompanying drawings.
<First Embodiment>

Figure 3:
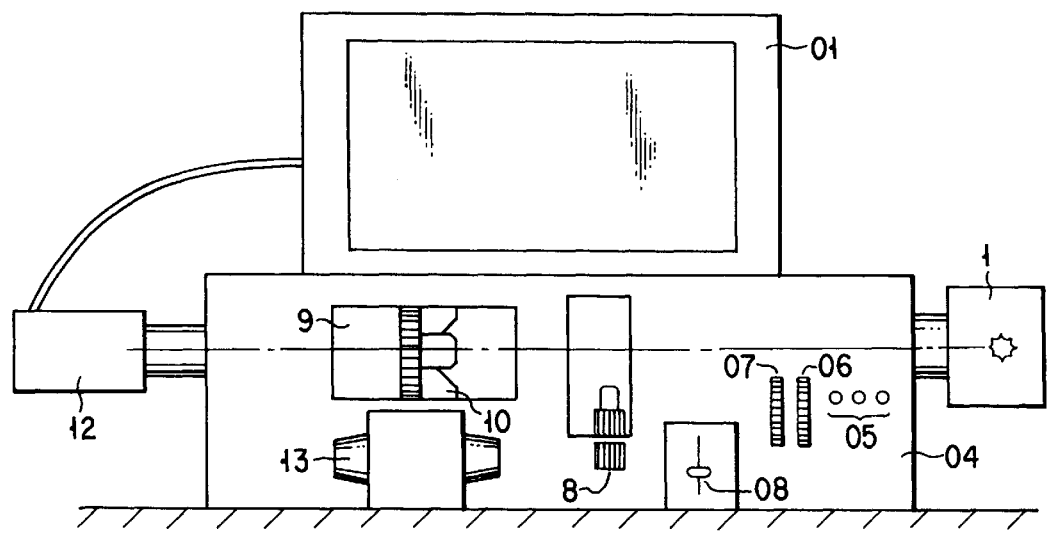
FIG. 3 is a front view of a construction of a monitor-aided microscope according to a first embodiment of the present invention.
Figure 4:
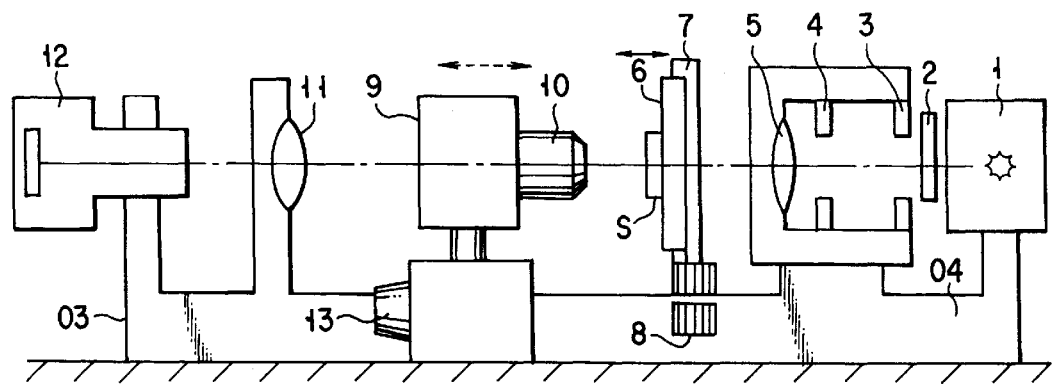
FIG. 4 is a detailed view of the construction without a monitor of the monitor-aided microscope shown in FIG. 3.

FIGS. 3 and 4 are illustrations of a monitor-aided microscope suited for transmission observation showing the first embodiment of the present invention. FIG. 3 is a front view of the microscope and FIG. 4 is a detailed view of the other components than a monitor.

The microscope comprises a light source 1 for illuminating a specimen (a subject) S to be observed, a stage 7 on which the specimen S is held, a stage operating knob 8 for moving the stage 7 to forward, backward, upper and lower, an objective lens 10 for viewing the specimen S, a focusing lens 11 for forming an optical image of the specimen S through the objective lens 10, an imaging optical system incorporating a television (TV) camera 12, and an observation condition switching means controlled by the observer for exchanging the objective lens 10 and others, which will be explained later in more detail.

The observation condition switching means includes an ND filter selector switch 05, a field-of-view control dial 06, an aperture control dial 07, an exposure control switch 08, and an objective lens revolver (referred to as a revolver hereinafter) 9.

The monitor-aided microscope is also featured in that the optical axis extending from the light source 1 to the TV camera 12 of the imaging optical system is horizontal and parallel to the floor level and the stage operating controls and the observation condition switching means are intensively mounted on one side (e.g., a front side) of a microscope body 04.

The description is continued in more detail. There are provided a television (TV) monitor 01, the TV camera 12, the light source 1, the microscope body 04, the ND filter selector switch 05, the field-of-view control dial 06, the aperture control dial 07, the exposure control switch 08, the stage operating knob 8, the revolver 9, and a focusing handle 13.

An aperture shutter 4 and a field-of-view shutter 3 are controlled by the aperture control dial 07 and the field-of-view control dial 06 respectively for varying the aperture diameter corresponding to the magnification and the type of the objective lens 10. The revolver 9 is designed for carrying a plurality of the objective lenses 10. This allows the observer to select a desired one of the object lenses 10 with an objective lens selector dial not shown.

A structure and action for motions of the stage 7 along directions, forward and backward, and upward and downward, by the stage operating knob 8 and along the optical axis of the stage 7 by the focusing handle 13 will be explained in reference to FIGS. 5A, 5B.

Figure 5A:
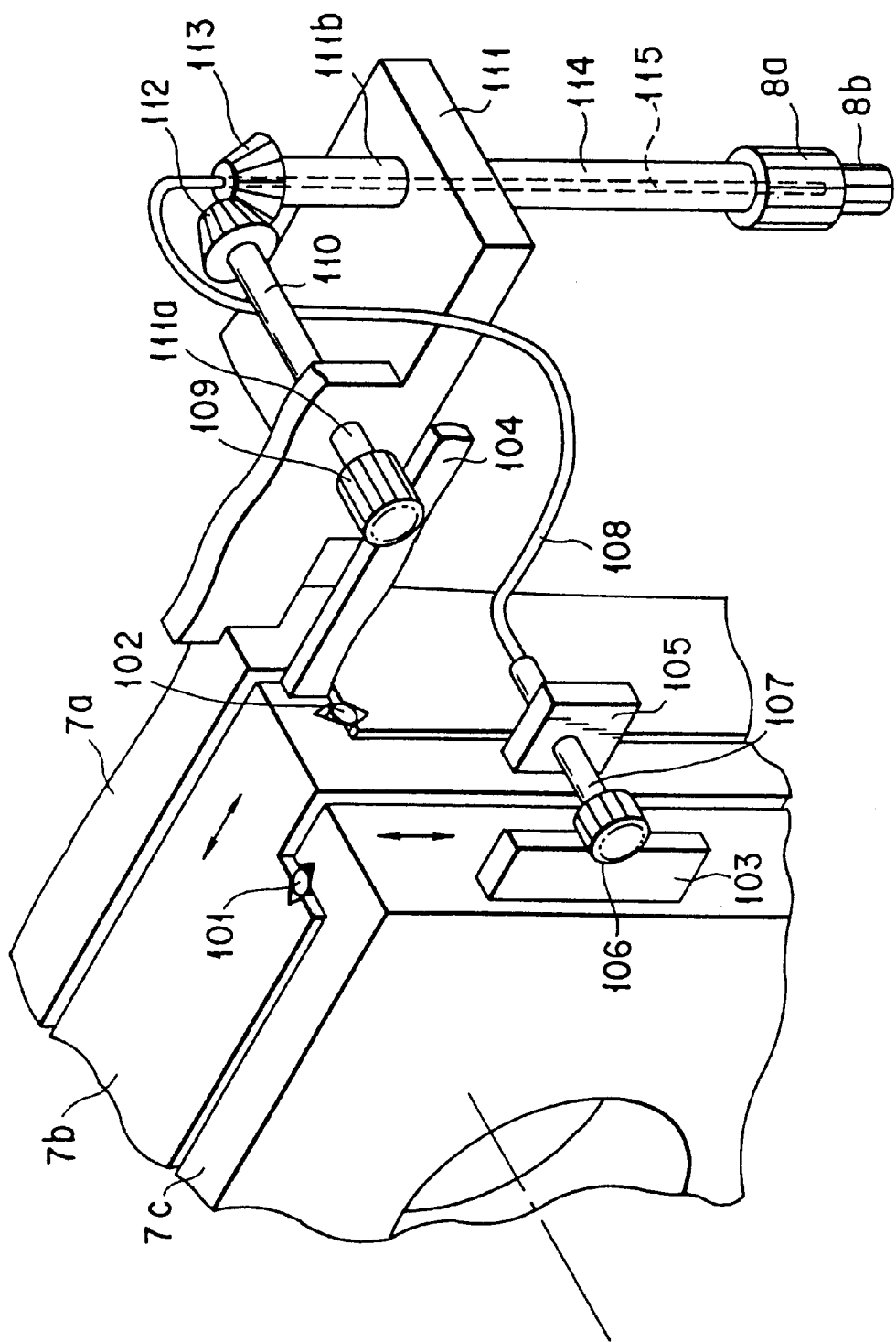
FIGS. 5A to 5C are views showing the controls in the monitor-aided microscope shown in FIGS. 3 and 4 which are operated by an observer.
Figure 5B:
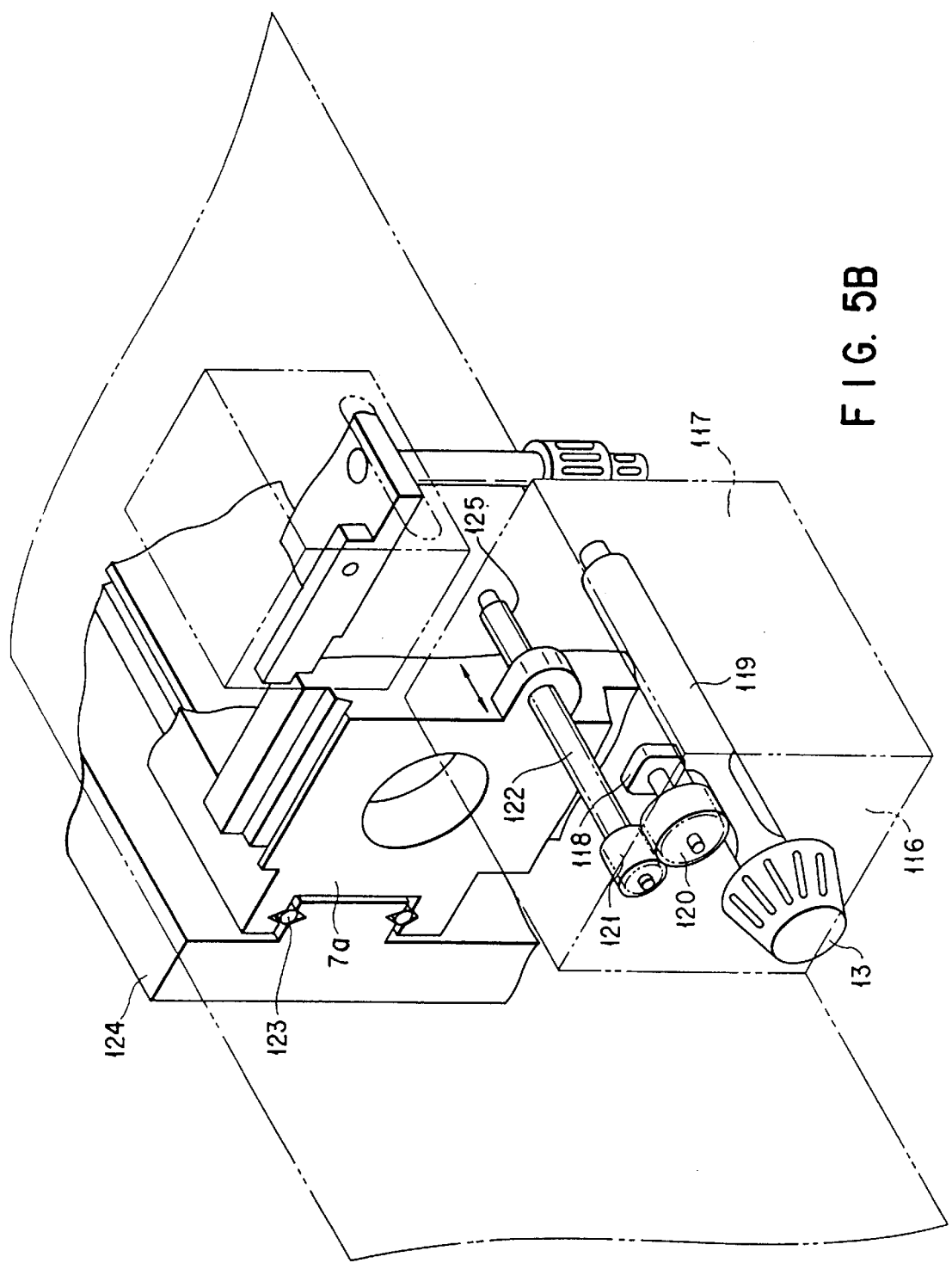

FIG. 5A is a detailed view for illustrating motions of the stage 7 by the stage operating knob 8 and FIG. 5B is a detailed view for illustrating motion of the stage 7 along the optical axis of the stage 7 by the focusing handle 13 with the outline depicted with two-dot chain lines. While part of the structure for the motion by the stage operating knob 8 is omitted in FIG. 5B, the part is the same as that of FIG. 5A.

The motions, forward and backward, and upward and downward, by the stage operating knob 8 will first be explained in reference to FIG. 5A.

The stationary stage 7a of the stage 7 is held fast in the focusing guide of FIG. 5B and moves neither along a forward/backward direction nor along an upward/downward direction. On the other hands the middle stage 7b and left stage 7c can move only in linear motions, forward/backward and upward/downward, relative to the stationary stage 7a with the help of the forward/backward guide 102 and the upward/downward guide 101 respectively.

The stage knob seat 111 is held fast to the stationary stage 7a and the shaft 114 and shaft 110 are held by the bearings 111b, 111a such that the shafts are rotatable with freedom but motion of either of shafts along a thrust direction is prohibited. The shaft 114 and shaft 110 are respectively provided with the forward/backward stage operating knob 8a and the bevel gear 113, and with the gear 109 and the bevel gear 112, which are held by the shafts in a one body and rotatable together with each shaft, and the shaft 114 and shaft 110 have the rotational axes which are included in the same plane and intersect with each other at a right angle at a position where the bevel gears 112, 113 are located in mesh with each other. The gear 109 meshes with a forward/backward rack 104 fixedly held by the middle stage 7b and the middle stage 7b is movable forward or backward by rotation of the gear 109.

The shaft 114 has a hole concentric to the rotational axis thereof inside the shaft and the shaft 115 is held in the hole so that the shaft 115 is rotatable with freedom and no motion thereof is allowed in a thrust direction. Both ends of the shaft 115 are provided with the upward/downward stage operating knob 8b and the wire 108, which are held by the shaft in a one body and rotatable together therewith, and the wire 108 are rotated by rotating the upward/downward stage operating knob 8*b*. On the other hand, the middle stage 7*b* has a bearing 105 held by itself which allows the shaft 107 to rotate while prohibiting motion of the shaft 107 along a thrust direction and both ends of the shaft 107 are provided with the gear 106 and the wire 108 which are held by the shaft 107 in a one body and rotatable together therewith. In addition, the gear 106 meshes with the upward/downward rack 103 fixedly held by the left stage 7*c* and the left stage 7*c* is movable upward or downward by rotation of the gear 106.

In the structure as described above, when the observer wishes to move the specimen S along a forward/backward direction, the forward/backward stage operating knob 8*a* is rotated. The shaft 114 and the bevel gear 113 are thereby rotated and rotation of the first rotational axis of the bevel gear 113 is converted to rotation of the second rotational axis of the bevel gear 112 positioned at an angle of 90 degrees from the first axis by meshing between the bevel gears 113, 112. Rotation of the bevel gear 112 having the rotation converted by 90 degrees is transmitted to the gear 109 through the shaft 110 and the forward/backward rack 104 meshing with the gear 109 is moved in a linear motion and thereby the rack moves the middle stage 7*b* together with the left stage 7*c* forward or backward, so that the specimen can be located to a desired position.

On the other hand, when the observer wishes to move the specimen S along a upward/downward direction, the upward/downward stage operating knob 8*b* is rotated. Thereby, the shaft 115 is rotated, then the rotation of the shaft 115 is transmitted to the wire 108, to the shaft 107 and to the gear 106 to move the upward/downward rack 103 meshing with the gear 106 in a linear motion and the left stage 7*c* is thereby moved upward or downward, so that the specimen can be located to a desired position.

Next, motion of the stage 7 along the optical axis by the focusing handle 13, that is focusing will be explained in reference to FIG. 5B.

The pinion 119 rotating together with the focusing handle 13 in one body and the gear 121 rotating together with the feed screw 122 in another body are confined between the walls 116, 117 expressed by outlines depicted with two-dot lines and furthermore, the gear 120 is confined between the wall 116 and the boss 118 and rotatably held with freedom while being prohibited from motion in a thrust direction.

The pinion 119 and the gear 120, and the gear 120 and the gear 121 mesh with each other in each combination, so that rotation of the focusing handle 13 is transmitted to the feed screw 122. The stationary stage 7*a* is held fast to a microscope body which constitutes the greater part of the outlined section depicted with two-dot chain lines in a manner such that the stationary stage 7*a* can only be moved in a linear motion along the optical axis through the focusing guide 123 relatively of the microscope stationary section 124, which does not move in any directions, upward/downward, forward/backward and left/right (along the optical axis).

Moreover, the feed screw 125 provided to the stationary stage 7*a* has the feed screw 122 which is threaded into itself, and which is rotatable together with the gear 121 in one body, and the stationary stage 7*a* is movable along the optical axis by rotating the feed screw 122.

In the structure described above, when the observer rotates the focusing handle 13, rotation is transmitted to the pinion 119, to the gear 120, to the gear 121, and to the feed screw 122 and the rotation is converted to a linear motion along the optical axis with the help of the feed screw 122 and the feed screw 125, so that the stationary stage 7*a* is moved along the optical axis and thereby focusing on the specimen can be achieved.

As apparent from the figures, the ND filter selector switch 05, the field-of-view control dial 06, the aperture control dial 07, the exposure control dial 08, the stage operating knob 8, and the objective lens revolver 9 all are located in the front of the magnification and the type of the objective lens 10. The revolver 9 holds a plurality of the objective lenses 10 and a desired one of them can be selected by the observer operating the unshown objective lens selector dial.

Figure 1:
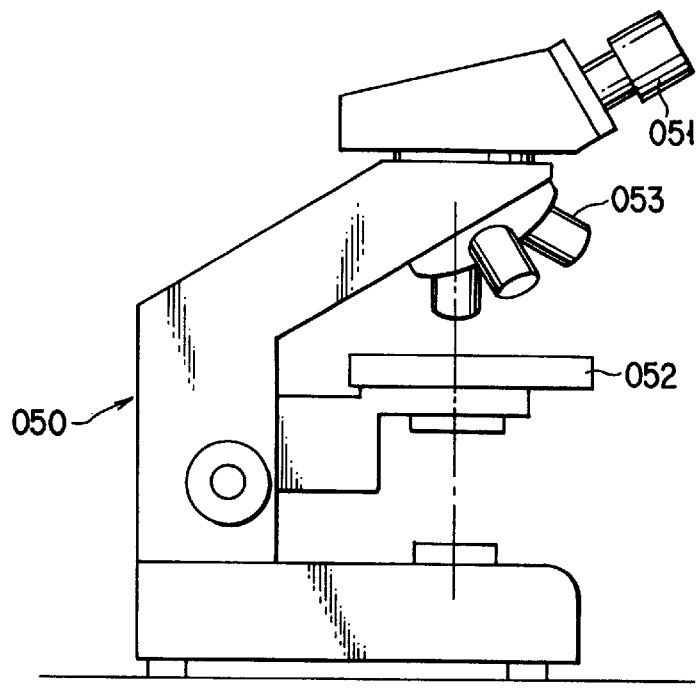
FIG. 1 is a side view of an overall construction of a conventional microscope.
Figure 2A:
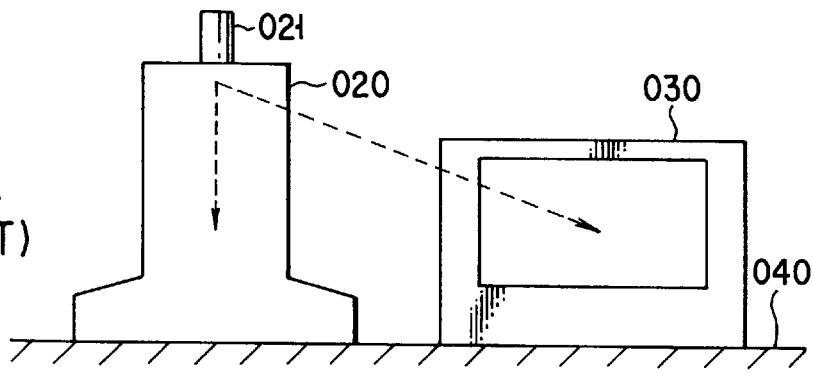
FIGS. 2A and 2B are constructions of two different conventional monitor-aided microscopes.
Figure 2B:
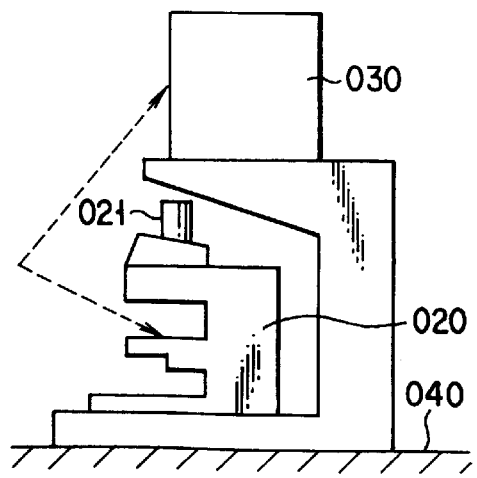

The optical system and the controls in the monitor-aided microscope which are highlighted in the first embodiment are now explained in more detail. The optical system of the first embodiment is featured in that the optical axis extending from the light source 1 to the focusing lens 11 is horizontal and parallel to a table or a vibration-free bed on which a frame 03 of the microscope is-seated. Accordingly, the height of the microscope is substantially less than ¼ that of the conventional microscope shown in FIG. 1.

The optical axis which extends horizontally gives the following advantages, as compared with any other conventional microscope.

(a) The microscope can be minimized in the height.

(b) The illumination of transmission type eliminates the need of reversing the optical axis and will hardly be declined in the intensity hence contributing to the lower cost.

(c) When a laser which is relatively heavy is required as the light source in a downward-illumination type, it can simply be placed on the floor for practical use.

(d) Since the area of installation of the frame on the floor is increased, the microscope will be less susceptible to vibration.

(e) The frame can be protected from thermal deforming.

(f) When the objective lens is at infinity, an intermediate lens can easily be disposed between the objective lens and the focusing lens.

Figure 5C:
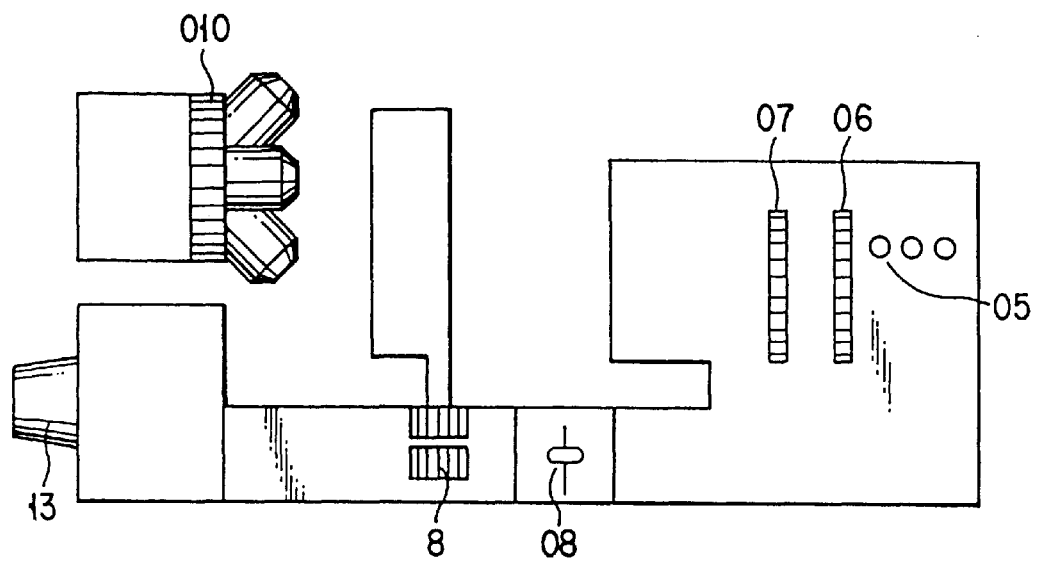

The action of changing the observation condition on the optical system of the monitor-aided microscope of the first embodiment will be explained. FIG. 5C illustrates the controls operated by the observer on the microscope of the first embodiment. The controls for changing the observation condition in the optical system including the filter selector switch 05, the field-of-view control dial 06, the aperture control dial 07, the exposure control dial 08 for adjusting the intensity of the illumination light, the state operating knob 8 for movement of the specimen, the focusing handle 13 for focusing, and the objective lens selector dial 010 are located in the front of the microscope body 04 and arranged in such a layout that the observer can operate the controls without visual confirmation (in blind-touch manner).

Figure 6:
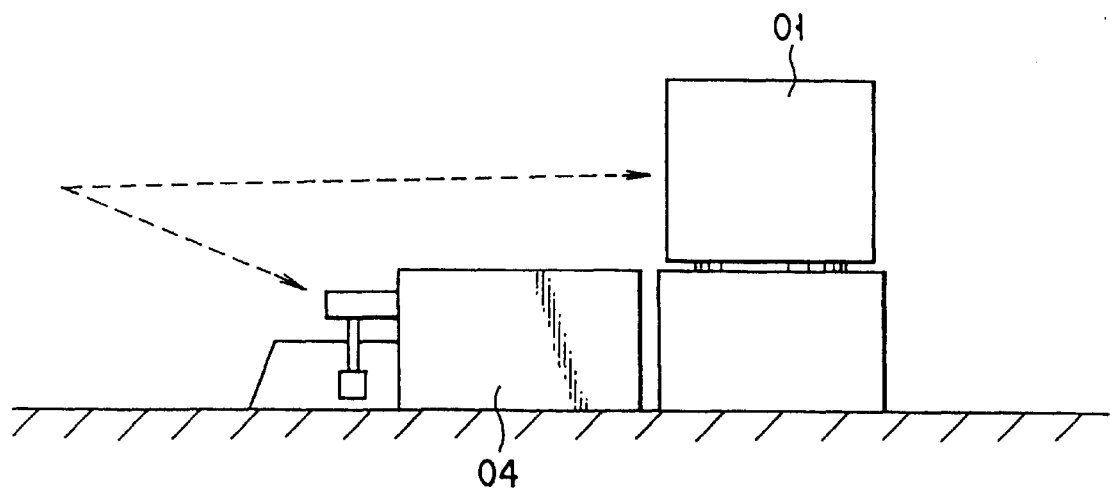
FIG. 6 is an explanatory view showing an advantageous action on the monitor-aided microscope shown in FIGS. 3 and 4.

FIG. 6 shows an action of observation with the microscope body 04 and the monitor 01 set up in the layout of the optical system and the controls of the microscope of the embodiment. Although the microscope body 04 and the TV monitor 01 are aligned one behind the other in front of the observer in FIG. 6, the TV monitor 01 may be placed on the microscope body 04 for equal effects. This allows the observer to shift his or her eyes between the microscope and the monitor through a small distance as denoted by the dotted lines while following the steps of:

(a) setting the specimen;

(b) determining the magnification of the objective lens;

(c) controlling the filter, the aperture size, and the other items in accordance with the objective lens;

(d) viewing the monitor;

(e) adjusting the stage to produce a correctly focused image of the specimen on the monitor; and (f) moving the specimen to center a target area to be observed.

As the controls of the microscope are located in such a layout that they are operated in the blind-touch manner with the monitor only being viewed, the microscope may be controlled by a skilled operator without gazing off from the monitor screen.

Accordingly, the microscope of the first embodiment of the present invention permits the observer to view and analyze the specimen through operating its controls without repeating a painful face turning action and suffering from an uncomfortable posture which are common with the conventional microscope, thus minimizing the fatigue of the observer and increasing its operability.

Although the operation of the stage 7 for selecting a field of view is performed using the stage operating knob 8 and the focusing is conducted by moving the stage 7 along the optical axis in the first embodiment, the former may be controlled with the use of a handle and the latter is adjusted by moving the objective lens.

The controls in the optical system is not limited to those of the first embodiment shown in FIG. 5C. It is apparent that the effect of the first embodiment can be maintained by the controls all located on one side of the microscope body even if the layout is modified with the optical elements shifted in their location or the number of the controls is increased.

Although the specimen is held by the specimen holder 6 (of a slider or rack system) on the stage 7 in the first embodiment, it may securely be positioned by suction with equal success.

The controls are not limited to manually operable types of the first embodiment. Some or all the controls may be powered. Other variations of the layout are possible where the optical axis in the microscope of either transmission type or downward-illumination type is extended horizontally on the floor and the monitor is located to minimize the overall height of the microscope.

<Second Embodiment>

Figure 7:
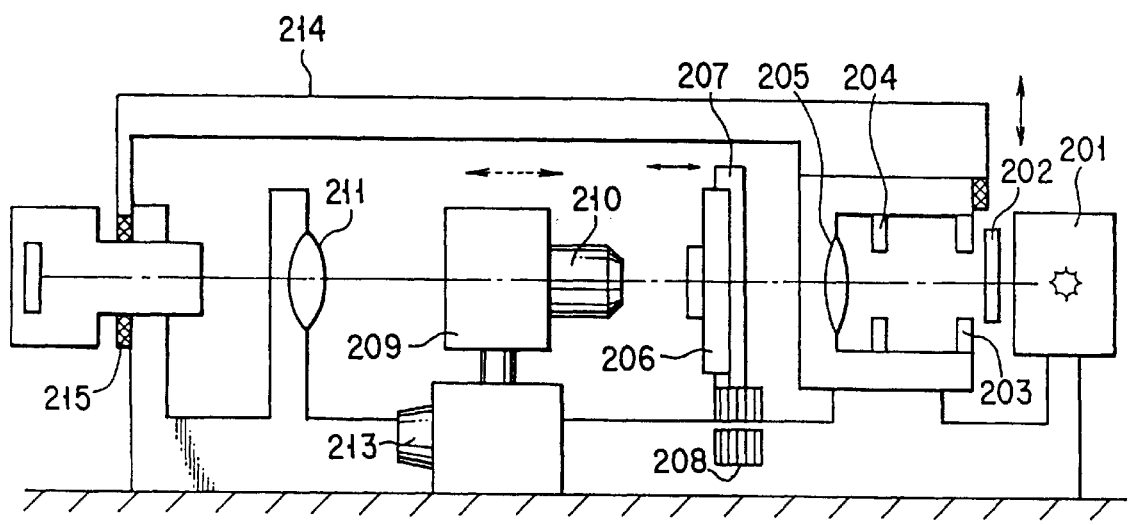
FIG. 7 is a side view of a monitor-aided microscope without a monitor showing a second embodiment of the present invention.

FIG. 7 illustrates a monitor-aided microscope of the second embodiment of the present invention (excluding a monitor). The arrangement of this embodiment is substantially similar to that of the first embodiment and a monitor mounting table 214 which is absent in the first embodiment will be explained.

As shown, the monitor mounting table 214 in the second embodiment is arranged integral with the frame of the microscope where the optical axis is horizontal and parallel to the floor level. A height adjusting mechanism 215 is provided on the monitor mounting table 214 for controlling the height of the monitor mounting table 214 with a known technique related to a joint to the microscope. The other components are identical to those of the first embodiment including a light source 201, a filter 202, a field-of-view shutter 203, an aperture shutter 204, a condenser lens 205, a specimen holder 206, a stage 207, a stage operating knob 208, a revolver 209, an objective lens 210, a focusing lens 211, and a focusing handle 213.

Figure 8:
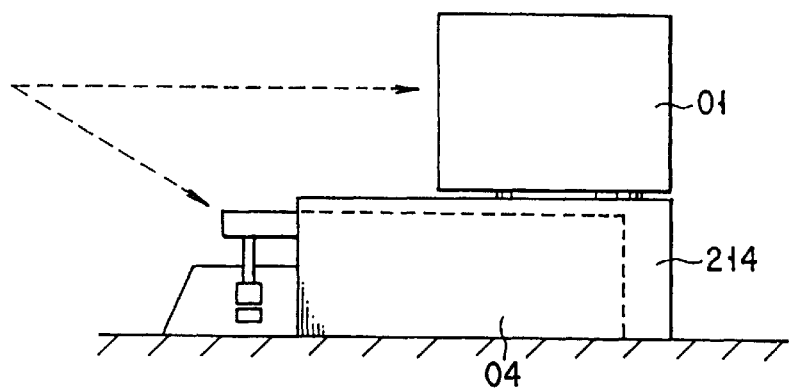
FIG. 8 is an explanatory view showing an advantageous action on the monitor-aided microscope shown in FIG. 7.

FIG. 8 shows the microscope and the TV monitor of this embodiment located for carrying out a monitor observation. As apparent, the microscope of the second embodiment has the TV monitor 01 placed on the microscope body 04 hence allowing the observer to operate the controls while viewing the monitor without feeling fatigued. Also, an extra space required for installation of the TV monitor 01 will be eliminated.

The monitor mounting table 214 is located directly over the microscope body prevents optical elements of the microscope from dust and dirt in the air as provides a dust-proof effect. Also, the height adjusting mechanism 215 of the monitor mounting table 214 offers an optimum layout of the microscope 04 and the TV monitor 01 corresponding to the size of the observer, thus contributing to the higher efficiency of working.

It would be clear that the advantage of the second embodiment is maintained when the monitor mounting table 214 is arranged detachable from the frame of the microscope body for ease of cleaning the optical elements in the microscope body although its attachment and detachment is not explained in this embodiment. A modification may be made to achieve the object of the present invention; for example, while the material of the monitor mounting table 214 is not specified, a thermally insulating material is preferably used for avoiding transmission of heat to the microcomputer body.

The present invention is not limited to the above embodiments and various modifications are possible without departing from the teaching of the present invention where the optical axis in the microscope body is extended horizontally on the floor and the monitor is located so as to minimize the overall height of the microscope.

According to the first and second embodiments of the present invention, the monitor-aided microscope is improved that the observer operates the controls of the microscope and simultaneously views the monitor at a higher efficiency, whereby the cost up will be eliminated and no increase of the overall size will be needed.

<Third Embodiment>

Figure 9:
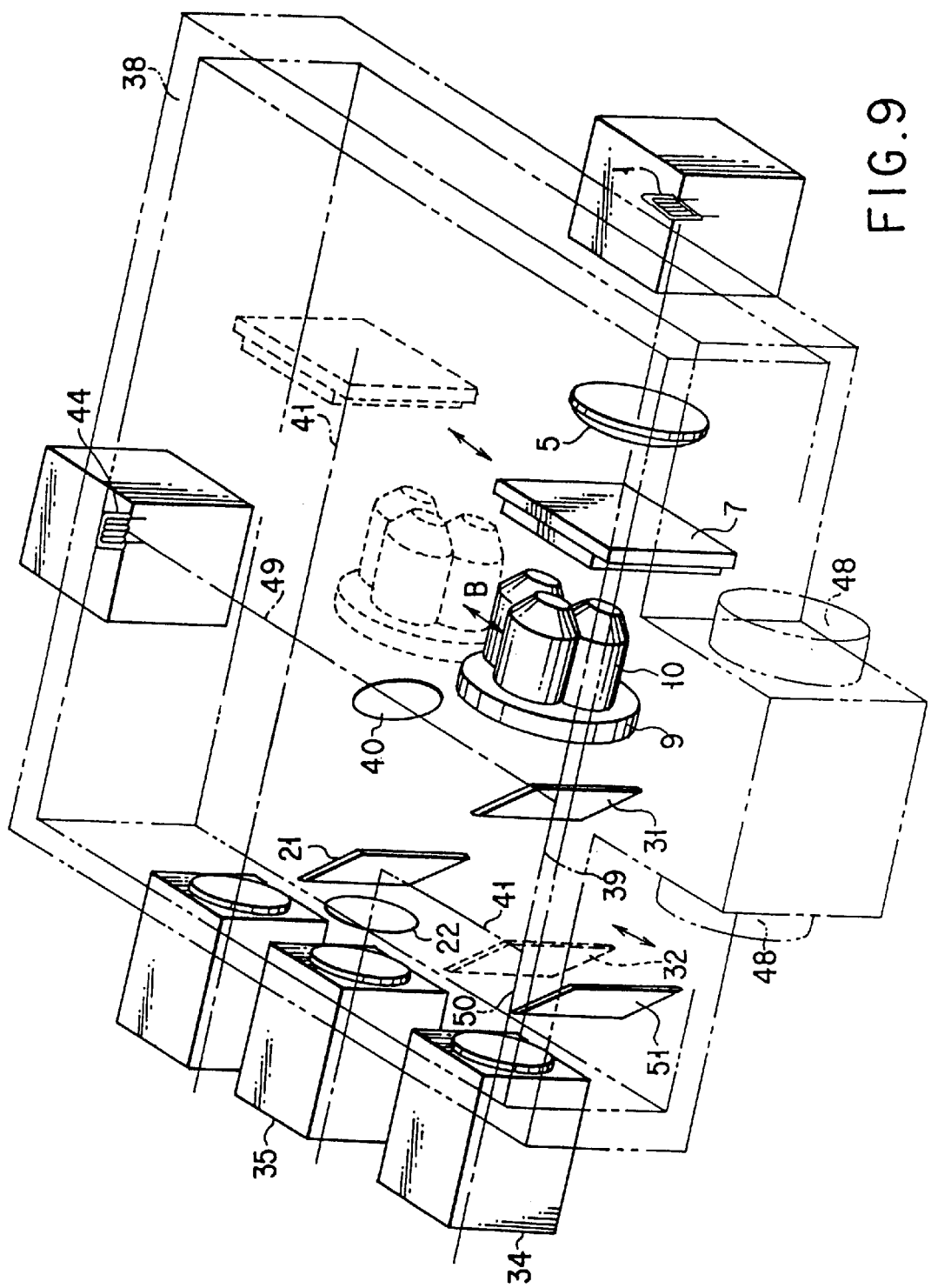
FIG. 9 is a perspective view of a construction of a monitor-aided microscope according to a third embodiment of the present invention.

FIGS. 9 and 10 show a monitor-aided microscope according to the third embodiment of the present invention. FIG. 9 is a perspective view and FIG. 10 is a schematic diagram of the microscope.

Schematically, the monitor-aided microscope has a switching means for selectively moving to and from the light path a projection optical system which comprises a plurality of objective lenses 10 having different rates of magnification and a revolver 9, and a stage 7 arranged movable in a plane vertical to the optical axis of the light path and on which the specimen S is placed. In addition, there are provided a pair of stage position detecting means or stage displacement detectors 28 and 29 for detecting the position of the stage 7 in the plane, a magnification detecting means or an objective lens indicator 19 for detecting the magnification of the projection optical system moved to the light path, two photo-to-electric converting means or image sensors 34 and 35 for producing a first video signal and a second video signal respectively, two image storage means or memories 25 and 36 for storing the first and second video signals as a first image and a second image respectively, a monitored image area specifying signal generating means or a CPU (central processing unit) 30 responsive to a stage position data from the stage position detecting means and a magnification data of the projection optical system from the magnification detecting means for producing and delivering a monitored image area specifying signal indicative of a region of the first image in the area of the second image to the image storage means, an image processing means or an image processor 26 for combining a plurality of the images received from the image storage means supplied with the monitored image area specifying signal, and a displaying means or a TV monitor 27 for displaying image signals from the image processing means.

This arrangement allows the observer to view enlarged images of the specimen and identify the current location and area of observation within the entire of the specimen on the TV monitor 27 regardless of typical limitations of the eye-piece lens.

This embodiment is now explained in more detail. The embodiment is almost identical to the first or second embodiment in the construction and action of the optical elements, the stage 7, and the revolver 9 except the microscope frame 38. It is differentiated by the fact that the transmission illumination from a light source 1 is implemented without the use of mirrors and the downward illumination is carried out with a downward illumination light source 44, a downward illumination lens 40, and a half mirror 31. The primary feature of the third embodiment is that the frame 38 is formed of a box-like unit structure having is an opening in one side or an upper side thereof and a monitor optical axis 39, a high-magnification optical axis 50, a low-magnification optical axis 41, and a downward illumination light path 49 all are horizontal and parallel to the top surface of the frame 38.

Illumination of light emitted from the transmission illumination light source 1 is passed through a collimator lens 42, a field-of-view shutter 3, an aperture shutter 4, and a condenser lens 5 and directed to the specimen S held on the stage 7. The stage 7 on which the specimen S is held is movable along two directions vertical to the optical axis.

The light from the specimen S is passed through an objective lens 10 on the revolver 9 and half mirrors 31 and 32 and then focused by a focusing lens 33 on an image sensor 34.

In the downward illumination mode, illumination of light emitted from the downward illumination light source 44 is passed through a collimator lens 45, a field-of-view shutter 46, an aperture shutter 47, and a condenser lens 18, reflected by the half mirror 31, and directed via the objective lens 10 to the specimen S.

The revolver 9 is movable along the optical axis (denoted by A) by means of a focusing unit 48. It is also responsive to an objective lens selecting signal from an objective lens selector 19 for selecting a corresponding objective lens 10 to be set across the light path.

Moreover, the revolver 9 is responsive to a signal from a light path switching unit 20 for moving to and from the optical axis (along the direction B).

When the revolver 9 has been retracted from the light path, an image of the specimen S is focused on an image sensor 35 by a low-magnification focusing lens 22 via the half mirrors 31, 32, and 21.

As the low-magnification focusing lens 22 has a deep depth of focus, it remains focused on the specimen S.

The images picked up and photoelectrically converted by the image sensors 35 and 34 are then saved as image data in memories 36 and 25 respectively.

An image processor 26 reads the image data from the memories 36 and 25, subjects them to electrical process, and displays on a monitor 27.

The stage 7 is equipped with a pair of stage displacement detectors 28 and 29 for detecting the location of the stage 7 along two directions vertical to the optical axis and delivering its data to a CPU 30.

The CPU 30 is responsive to the stage location data from the stage displacement detectors 28 and 29 and an objective lens magnification data from the objective lens selector 19 for producing and delivering a corresponding signal to the memory 36.

The practical action on the monitor-aided microscope having the foregoing arrangement is explained in more detail.

The action starts with the observer setting the specimen S to the stage 7 and pressing a macroimage pickup switch, not shown, mounted to a microscope body or any peripheral installation. A signal from the macroimage pickup switch is transferred to a light path switching unit 20 which in turn retracts the revolver 9 from the light path and shifts the optical axis to a macroimage light path to have a large image of the specimen (referred to as a macroimage) without using the objective lens 10. Accordingly, the macroimage is focused by the low-magnification focusing lens 22 on the image sensor 35. The macroimage is photo-electrically converted by the image sensor 35 and saved in the memory 36 as a still image shown in FIG. 11.

The light path switching unit 20 then returns the revolver 9 to its location where its objective lens 10 is set across the light path. This allows the specimen to be viewed through the objective lens 10 of the revolver 9.

The observer while viewing the TV monitor 27 operates the focusing unit 48 to move the revolver 9 along the optical axis and focus the specimen S. The light from the specimen is directed along the light path which extends across the objective lens 10 selected by the objective lens selector 19 (referred to as a realtime image light path), passed through the half mirrors 31 and 32, and focused by the focusing lens 33 on the image sensor 34 to form an image (referred to as a realtime image). An photo-to-electic conversion signal from the image sensor 34 is temporality saved in the memory 25 as an image data shown in FIG. 12.

As the stage 7 has been displaced by the observer, the stage displacement detectors 28 and 29 supply the CPU 30 with signals which represent the displacements of the stage along the two directions vertical to the optical axis. The CPU 30 then calculates from those signals the current target of observation in the macroimage saved in the memory 36 and simultaneously, determines a size of the target in the macroimage with reference to the magnification of the objective lens 10 from the objective lens selector 19. Resultant data are delivered to the memory 36.

Also, the CPU 30 transfers the magnification of the objective lens 10 to the memory 36.

A resultant macroimage saved in the memory 36 is shown in FIG. 13 where the realtime image of the current target of observation is combined with the original macroimage shown in FIG. 11. The realtime image is defined by a frame F showing the location and the area of the target to be observed within the macroimage. The magnification of the objective lens 10 is displayed in a window denoted by G.

The image processor 26 combines the realtime image temporality saved in the memory 25 and the image processed by the CPU 30 and saved in the memory 36 and displays a combined image on the TV monitor 27. As shown in FIG. 14, the combined image includes the realtime image at the location denoted by F, the macroimage at the location denoted by G outside of F, and the magnification of the objective lens at the location denoted by I.

The CPU 30 constantly receives the signals from the stage displacement detectors 28 and 29 and the magnification of the objective lens from the objective lens selector 19. Upon the stage 7 being moved or the magnification of the objective lens 10 being changed, the CPU 30 conducts the above mentioned action with the memory 36.

Accordingly, the observer can view the realtime image produced by the objective lens 10, its location and size in the macroimage of the specimen S, and the magnification of the objective lens 10 which are displayed at one time on the monitor 27.

More specifically, the observer directly views an enlarged image of the specimen and its location and size in a covered area of interest on the monitor 27 without difficulty pertinent to the eye-piece lens and can hence be allowed to identify the target location and judge that the image of the target location on the specimen S is correctly focused. The operation of the microscope will thus be carried out readily and efficiently.

Although the magnification of the objective lens 10 is the only information about the microscope supplied and displayed on the monitor in the embodiment, other data such as a mode of microscope observation, an intensity of illumination light, and actions of optical elements, can be produced with corresponding sensors mounted at their respective locations in the microscope and/or input from external devices for display on the monitor 27.

The layout and size of display on the monitor 27 are not limited to those of the realtime image, the macroimage, the magnification of the objective lens of the embodiment and may be determined arbitralily depending on the requirements.

The third embodiment of the present invention is intended to overcome the following disadvantages of the prior art.

Microscopes for having enlarged views of a micro-sized specimen are used in a wide range of fields including biology, medical studies, and inspection in industries. For example, one of such microscopes is disclosed in Jpn. Pat. Appln. KOKAI Publication No. 7-199077 (first citation) where photographic devices for taking pictures of a subject, external controls for automatically controlling moving parts of the microscope, and other devices are combined in a system with a microscope assembly.

In operation, the observer views the specimen through an eye-piece (referred to as BI) mounted to the microscope assembly. As BI is fixedly mounted to a given region of the microscope assembly, it causes the observer to remove the eyes from BI, perform a task, and view again through BI for changing the mode of observation, controlling the intensity of illumination light, setting the specimen, or loading and unloading the optical devices. This will result in declination of the working efficiency and fatigue of the observer in the operation.

For overcoming the disadvantage of the first citation, an improvement is disclosed in Jpn. Pat. Appln. KOKAI Publication No. 5-34601 (second citation) where operation switches for electrically enabling the functions of a microscope are disposed at a central region of the microscope body and the status of the function is displayed in a portion of the field of view of BI, allowing the observer to operate the microscope without removing the eyes from BI.

In the second citation, the operation switches for enabling the functions are collectively disposed on a limited number of control panels on the microscope body and their selection and operation will be troublesome. Accordingly, the observer needs a degree of skill for controlling the operation switches while viewing BI. Since the field of view of BI is limited, it hardly allows many pieces of information can be displayed at once.

Also, the observation through BI determines the posture (the position of the eyes) of the observer and limits control over the distance between the eyes and the sighting. Moreover, it allows no simultaneous observation by two or more observers.

For compensation, some techniques employing a monitor for displaying images of the specimen are known. Such a technique allows light passed through the specimen to be optically focused by an appropriate optical system on an imaging device such as a CCD to form an optical image which is then converted into an electric signal and displayed on the monitor provided separately of the microscope body.

However, the monitor employing technique also has the following drawbacks.

In common, for viewing a desired location on the specimen through an objective lens of higher magnification, an objective lens of lower magnification is first used to find and center the desired location in the field of view before shifting to the objective lens of higher magnification. This operation is however time consumed.

Also, when the target location being viewed through the objective lens of higher magnification is identified on the specimen, the objective lens has to be shifted to lower magnification to have a wider view of the entire specimen and, after the target is centered, returned back to higher magnification for precise observation of the target. Simultaneously, the specimen held on the stage is viewed from a side to determine where is the distal end of the objective lens over the specimen for rough sighting. These actions will also consume an extra time.

Because the objective lens of higher magnification has a shallow depth of focus, it may fail to develop a proper image of the specimen which is fairly distanced from the focusing point. Therefore, the observer has difficulty to determine whether the target is outside the field of view or out of the focusing point as it is not viewed.

Another technique is disclosed in Jpn. Pat. Appln. KOKAI Publication No. 5-127087 (third citation) where an image of the specimen formed by the objective lens is divided into two, low and high, magnification segments transmitted along two light paths. While a high magnification image of the target is displayed on one of the two monitors, a low magnification image which shows a wider extension of the specimen is displayed on the other together with the location and area of the target.

According to the third citation, a first image or the high magnification image on one of the two monitors and a second image or the low magnification image including the location and size of the target on the specimen can alternately be viewed thus eliminating the drawbacks of the second citation.

However, the third citation is also unfavorable in that the two monitors for displaying the low magnification image and the high magnification image respectively are viewed by the observer shifting the eyes or swinging the head from one to the other. This will hardly relieve the load of working.

The two monitors require an extended area of installation on the microscope table.

In the third citation, the two, low and high, magnification images are taken through the objective lens. As the low magnification image is defined by the field of view of the objective lens, its extension will hardly be large enough to cover the entire size of the specimen. Generally, the objective lens of a microscope offers 20 to 25 of fields of view. For viewing the entire image of a small specimen of 100 in size, for example, a cross section of a rat brain, the magnification of the objective lens is preferably 0.2 to 0.25 (=100/20–25).

Since the focal distance of the objective lens (from the specimen to an objective lens barrel) is about 50 mm and the optical barrel length (from the barrel to an image side of the objective lens) is about 150 mm, the objective lens of 0.2 to 0.25 power has to be set with its principal point spaced by more than 100 mm from the lens barrel towards the image forming side along close to the optical axis. More particularly, the objective lens is disposed adjacent to the principal point to minimize optical aberration.

In practice, the objective lens is installed in the barrel and implemented by a high power concave lens. Also, for minimizing its optical aberration, the objective lens has to comprise a number of lenses thus increasing the overall cost. It is possible to increase the number of fields of view and enlarge the focal distance. This will unfavorably increase the overall size of the microscope.

A further technique is known as disclosed in Jpn. UM Appln. KOKAI Publication No. 48-75652 (fourth citation) where the magnification of an image is changed by directing the light path to a desired lens after the objective lens. It may be all right when an image produced by the objective lens is reduced to a size corresponding to the size of an image sensor such as a video camera with the entire field of view of the objective lens involved. The field of view is also limited by the objective lens, similar to the use of a low magnification objective lens, and it is almost impossible to increase the field of view. When the image through the objective lens is increased by a higher power, the numerical aperture (NA) which determines the resolution will be limited by the objective lens. As the resolution is hardly improved, simply increasing the magnification is a negative idea.

It is known that some macro-observation systems for having only macroimages of an object have been developed. While high power observation is not allowed, switching between high magnification and low magnification on the system will hardly be realized.

The third embodiment of the present invention described previously permits any desired target area to be easily sighted within the entire area of a specimen for higher magnification and higher resolution. Also, the field of view can be obtained greater than that of a conventional low magnification objective lens. In the monitor-aided microscope of the third embodiment, those advantages are implemented with a simpler arrangement and at lower cost.

According to the third embodiment, the optical axis extending from the light source to the image formation system may be vertical or horizontal to the floor with equal success.

Although the switching between the realtime image light path and the macroimage light path is made by the revolver 9 moving to and from the monitor optical axis in the third embodiment, it may be implemented by any other action, e.g. displacement of the stage 7, as various modifications are possible without departing the scope of the present invention. For example, similar to the first or second embodiment, the microscope is constructed such that the stage 7 is movable along the optical axis instead of the revolver (objective lens).

<Fourth Embodiment>

The fourth embodiment of the present invention will be described referring to FIG. 15.

The action up to display on the monitor an image produced by the image sensor is identical to that of the second embodiment and its explanation will be made in no more detail. This embodiment is explained particularly about the microscope body including a low magnification optical system, a high magnification optical system, and a switching means for switching between the two systems.

FIG. 15 illustrates an overall arrangement of the microscope body of the embodiment.

Illumination light emitted from a light source 1 is passed through a transmission illumination system 54 which includes a collimator lens 42, a field-of-view shutter 3, a mirror 52, and a window lens 53 and is installed in a microscope frame 38 and directed to the specimen S via a condenser lens 5 equipped with an aperture shutter 4.

The illumination light transmitted through the specimen S is further directed to run along selectively one of two light paths in the first high magnification optical system and the second low magnification optical system before focused to form an image.

The first optical system is first explained. The illumination light transmitted through the specimen S is focused via a revolver 9 by an objective lens 10 disposed across a monitor optical axis 39 on the light receiving surface 34a of an image sensor 34 to form an image of the specimen S. A mirror 51 is mounted to the frame 38 for movement to and from a high magnification optical axis 50 and when the first optical system is selected, retracted from the high magnification optical axis 50. The objective lens 10 is composed of a number of lenses set on the revolver 9. As the revolver 9 rotates about its rotary shaft 9a, the objective lens 10 of a desired magnification is selectively moved to and set across the monitor optical axis 39.

The revolver 9 is also slidable with its entirety along the direction denoted by the arrow in FIG. 15 for moving to and from the monitor optical axis 39. When the revolver 9 is set across the monitor optical axis 39, it is precisely positioned by a click mechanism not shown so that the monitor optical axis 39 aligns with one of optical axes of the objective lens 10. With the first optical system selectively enabled, the revolver 9 remains set across the monitor optical axis 39.

The second optical system is now explained. The illumination light from the specimen S is passed along the monitor optical axis 39 and reflected 90 degrees by the mirror 51 to run along the low magnification optical axis 41. It is then reflected 90 degrees by a mirror 21 and focused by a low magnification lens 22 on the light receiving surface 35a of an image sensor 35 to form a low magnification image.

When the second optical system is selected, the mirror 51 is set across the monitor optical axis 39 and the revolver 9 is retracted from the monitor optical axis 39. As the revolver 9 is in its retracted state, it does not disturb the effective flux of the light in the second optical system.

Accordingly, the observer can selectively switch between the first optical system for high magnification with the objective lens 10 and the second optical system for low magnification without the objective lens 10 through simply moving the revolver 9 and the mirror 51 to and from their corresponding optical axes in order to display on the monitor the images produced by the image sensors 34 and 35. Since the effective flux of the light in the second optical system for macroimage observation is guaranteed with the revolver 9 held at its retracted stage, a generous space can be provided about the monitor optical axis 39 hence allowing a wider field of view at the low magnification for the macroimage observation.

Also, the macroimage observation optical system is disposed off the objective lens 10 and the revolver 9, hence eliminating the provision of extra apertures for directing the light to the objective lens 10 and the revolver 9. Thereby, the arrangement of the objective lens 10 and the revolver 9 will be maintained smaller and the number of lenses of the objective lens 10 on the revolver 9 will hardly be limited.

In the fourth embodiment, both the first and second optical systems employ no half mirrors thus giving a higher brightness for the observation.

<Fifth Embodiment>

The fifth embodiment of the present invention will be described referring to FIGS. 16 and 17.

Like components are denoted by like names and like numerals as those of the fourth embodiment and will be explained in no more detail. The feature of this embodiment only is explained definitely.

FIG. 16 shows an overall arrangement of a microscope body of the embodiment. Illumination for the specimen S is identical to that of the previous embodiment. The light transmitted through the specimen S is selectively directed to a first optical system for high magnification defined across the objective lens 10 or a second optical system for low magnification (a macroimage observation optical system) with no use of the objective lens 10 before focused to have an optical image of the specimen S.

The first optical system is now explained.

The light from the specimen S is passed through the objective lens 10 set across a monitor optical axis 39, a revolver 9 mounted to a frame 38, and a half mirror 55 and directed to the light receiving surface 34a of an image sensor 34 to form an image of the specimen S. The objective lens 10 is composed of a number of lenses mounted on the revolver 9. As the revolver 9 rotates about its rotary shaft 9a, the objective lens 10 of a desired magnification is moved to and set across the monitor optical axis 39.

FIG. 17 is a view of the revolver 9 seen from the direction denoted by the arrow C in FIG. 16.

As described, the revolver 9 holds the lenses of the objective lens 10 in its apertures 9b to 9d designed for passing the effective flux of the light. The apertures 9b to 9d and an extra aperture 9e are arranged in a circle about the rotary shaft 9a of the revolver 9 for movement to and from the monitor optical axis 39. The aperture 9e is specified for the macroimage observation as enlarged in the diameter for passing the effective flux of the light of the second optical system (the macroimage observation system).

The second optical system (the macroimage observation) is explained for its path.

The revolver 9 is rotated about the rotary shaft 9a so that the microimage observation aperture 9e comes with its center across the monitor optical axis 39. The light transmitted through the specimen S is thus passed along the monitor optical axis 39 through the revolver 9 and reflected 50% of its amount by a half mirror 55. As the monitor optical axis 39 is bent by 90 degrees, the light is shifted to run along a low magnification optical axis 41. The light is then passed through a low magnification focusing lens 22 and reflected 90 degrees by a mirror 21 so that an image of the specimen S is formed on the light receiving surface 35a of an image sensor 35.

Accordingly, the observer can selectively switch between the first optical system for high magnification with the objective lens 10 and the second optical system for low magnification or macroimage observation without the objective lens 10 by performing as a simpler action as rotating the revolver 9 which is similar to a known action in a conventional microscope of controlling the objective lens. Thereby, the images produced by the image sensors 34 and 35 can be displayed on the monitor for ease of the observation.

In particular, as the revolver 9 carrying the objective lens 10 has the specific aperture of a greater diameter provided therein with no extra arrangement given as for a typical microscope equipped with the objective lens 10, it can easily be replaced with another thus contributing to the lower cost of the microscope.

<Sixth Embodiment>

The sixth embodiment of the present invention will be described referring to FIG. 18.

Like components are denoted by like names and like numerals as those of the fourth or fifth embodiment and will be explained in no more detail. The feature of this embodiment only is explained definitely.

FIG. 18 shows an overall arrangement of a microscope body of the embodiment. A unit for illuminating the specimen S and a revolver 9 are identical to those of the fourth embodiment. The light transmitted through the specimen S is selectively directed to a first optical system for high magnification defined across the objective lens 10 or a second optical system for low magnification (a macroimage observation optical system) with no use of the objective lens 10 before focused to have an optical image of the specimen S. In FIG. 18, the first optical system is in use.

The first optical system is now explained. The light from the specimen S is passed through the objective lens 10 set across a monitor optical axis 39 and one of objective lens mounting apertures 9b to 9d provided in the revolver 9 mounted to a frame 38 and directed to the light receiving surface 34a of an image sensor 34 to form an image of the specimen S.

A low magnification focusing lens 22 is supported by the frame 38 for movement to and from the monitor optical axis 39. When the first optical system is selected, the low magnification focusing lens 22 remains retracted from the monitor optical axis 39.

The second optical system (the macroimage observation) is explained for its path. The revolver 9 is rotated about its rotary shaft 9a so that a microimage observation aperture 9e comes with its center across the monitor optical axis 39. At the time, the low magnification focusing lens 22 is moved to and set across the monitor optical axis 39. The light transmitted through the specimen S is thus passed along the monitor optical axis 39 through the macroimage observation aperture 9e of the revolver 9 and focused by the low magnification focusing lens 22 on the light receiving surface 34a of an image sensor 34 to form an image of the specimen S.

Accordingly, the observer can selectively switch between the first optical system for high magnification with the objective lens 10 and the second optical system for low magnification or macroimage observation without the objective lens 10 by setting on and off the objective lens 10 on the revolver 9 and moving the low magnification focusing lens 22 to and from the monitor optical axis. Thereby, the image produced by the image sensor 34 can be displayed on the monitor for ease of the observation.

The sixth embodiment permits the low magnification focusing lens 22 to move to and from the monitor optical axis 39, hence giving a higher brightness for the observation with no use of mirrors in either the first or second optical system. A variety of images are picked up by the single image sensor 34 whereby the monitor-aided microscope of the embodiment will thus be improved in the space saving and decreased in the cost.

<Seventh Embodiment>

The seventh embodiment of the present invention will be described referring to FIG. 19.

Like components are denoted by like names and like numerals as those of the fourth, fifth, or sixth embodiment and will be explained in no more detail. The feature of this embodiment only is explained definitely.

FIG. 19 illustrates shows an overall arrangement of a microscope body of the embodiment. A unit for illuminating the specimen S and a revolver 9 are identical in the construction and the operation to those of the fifth or sixth embodiment. Also, similar is that a first optical system and a second optical system are provided and switched one from the other for the observation. The first optical system is now explained. An objective lens 10 is not identical to that of any of the fourth to sixth embodiments but is an infinite objective lens focusing at an infinite location. The light transmitted through the specimen S is collimated by the objective lens 10 set across a monitor optical axis 39, passed through a revolver 9 along the monitor optical axis 39, and focused by a low magnification focusing lens 22 on the light receiving surface 34a of an image sensor 34 to form an image of the specimen S.

The low magnification focusing lens 22 is supported by a frame 38 for movement to and from the monitor optical axis 39 along the direction denoted by the arrow. When the first optical system is selected, the focal point at rear side of the low magnification focusing lens 22 coincides with the light receiving surface 34a of the image sensor 34 for projecting the image through the objective lens 10.

The second optical system (the macroimage observation) is explained for its path. The revolver 9 is rotated about its rotary shaft 9a so that a microimage observation aperture 9e comes with its center across the monitor optical axis 39. This allows the light from the specimen S is passed through the macroimage observation aperture 9e of the revolver 9 along the monitor optical axis 39 and focused by the low magnification focusing lens 22 on the light receiving surface 34a of an image sensor 34 to form an image of the specimen S. The focusing lens 22 may stay at the same location on the monitor optical axis 39 as with the first optical system so long as the light receiving surface 34a of the image sensor 34 is within the depth of the optical image of the specimen S. If it is out of the depth, the focusing lens 22 should be biased towards the objective lens 10 to focus the image of the specimen S on the light receiving surface 34a.

Accordingly, the observer can selectively switch between the first optical system for high magnification with the objective lens 10 and the second optical system for low magnification or macroimage observation without the objective lens 10 by setting on and off the objective lens 10 on the revolver 9 and when needed, moving the low magnification focusing lens 22 to and from the monitor optical axis. Thereby, the image produced by the image sensor 34 can be displayed on the monitor for ease of the observation. Also, shown are objective lens focusing light 61 and macroimage focusing light 62.

The seventh embodiment of the present invention permits the focusing lens 22 for focusing an image through the objective lens 10 to be commonly used as a macroimage lens for forming a macroimage of the specimen S, thus decreasing the overall cost. Also, it is unnecessary to move the focusing lens 22 when the switching between the first optical system and the second optical system is successfully carried out by the rotating action of the revolver 9. This will simplify the operation.

<Eighth Embodiment>

The eighth embodiment of the present invention will be described referring to FIG. 20.

Like components are denoted by like names and like numerals as those of the fourth to seventh embodiments and will be explained in no more detail. The feature of this embodiment only is explained definitely. FIG. 20 illustrates shows an overall arrangement of a microscope body of the embodiment. A transmission illumination unit 54 for illuminating the specimen S for high power observation and a condenser lens 5 are identical to those of the fourth to seventh embodiments. A revolver 9 is substantially identical to that of the fourth embodiment, except that a sliding mechanism for moving the revolver 9 to and from the monitor optical axis is not provided. Also, similar is that a first optical system for high magnification and a second optical system for low magnification are provided and switched one from the other for the observation. The first optical system is now explained. The light transmitted through the specimen S is focused by an objective lens 10 set across a high magnification optical axis 50 on the light receiving surface 34a of an image sensor 34 via the revolver 9 to form an image of the specimen S.

The second optical system is explained for its path. A stage 7 comprises a stage stationary unit 7b and a stage movable unit 7a. The movable unit 7a is moved to and from the stationary unit 7b in a plane vertical to the high magnification optical axis 50 and a low magnification optical axis 41. Also, the specimen S can be moved to and positioned across the low magnification optical axis 41 by a click mechanism not shown. The returning of the specimen S to its original position across the high magnification optical axis 50 is also possible. A light source 63 for low magnification illumination is disposed across the low magnification optical axis 41 below the specimen S, which may be a planer luminescent light or a combination of a glass fiber and a light guide plate for illumination of a wider area.

When the second optical system is selected, the stage 7 is moved to carry the specimen S to the low magnification optical axis 41 for illumination with the low magnification illumination light source 63. The light transmitted through the specimen S is passed across a low magnification aperture 38a to the low magnification optical axis 41 and focused by a low magnification focusing lens 22 on the light receiving surface 35a of an image sensor 35 to form a low magnification image of the specimen S.

Accordingly, the observer can selectively switch between the first optical system for high magnification with the objective lens 10 and the second optical system for low magnification or macroimage observation without the objective lens 10 by shifting the location of the stage 7. Therefore, the images produced by the image sensors 34 and 35 can be displayed on the monitor for ease of the observation. This embodiment eliminates a conventional two-step action for retracting the objective lens 10 from the monitor optical axis and setting the low magnification focusing lens 22 across the monitor optical axis for the macroimage observation and allows the switching between the first optical system and the second optical system to be executed by simply moving the stage 7.

<Ninth Embodiment>

The ninth embodiment of the present invention will be described referring to FIG. 9.

This embodiment is a combination of the fourth embodiment for switching the two optical systems by the movement of the revolver 9 and the eighth embodiment for switching the two optical systems by the movement of the stage 7. The primary components including optical elements, a stage, and a revolver, but not a microscope frame 38, are identical while the transmission illumination is made with no mirrors and the downward illumination is implemented by a downward illumination light source 44, a downward illumination lens 40, and a half mirror 31, and will be explained in no more detail. In particular, a monitor optical axis 39, a high magnification optical axis 50, a low magnification optical axis 41, and a downward illumination optical axis 49 in this embodiment are horizontal and parallel to a table of the microscope. The frame 38 is shaped of a box-like unit structure having one side or an upper side provided with an opening.

According to the embodiment, the microscope frame 38 is seated lower and the other components are disposed on the common horizontal surface, hence increasing the rigidity and the stability. For example, as shown in the fourth embodiment of FIG. 15 or the eighth embodiment of FIG. 20, the frame 38 has a longer throat 1 and a shorter depth m in the size thus saving a generous space for the movements of the revolver 6 and the stage 7 without decreasing its rigidity. Also, the microimage observation optical system and the downward illumination are desirably layouted without sacrificing the rigidity. For example, a focusing unit 48 for focusing the specimen S can be located with consideration of the operability at priority.

The ninth embodiment features the parallel alignment of the illumination and monitor optical axes with the horizontal table, the lower structure of the microscope frame, and the arrangement of the components over the horizontal table, increasing the rigidity and the stability. Also, it offers generous spaces saved for movement of the objective lens and the revolver, dislocation of the stage, and layout of the microimage observation optical system, thus improving the freedom for positional arrangement of the components in order to increase the operability.

<Tenth Embodiment>

As a substantial construction of a monitor-aided microscope of the tenth embodiment is similar to that of the third embodiment shown in FIGS. 9 and 10, a discrepancy including the action of a CPU 30 and a memory 36 and the display of a monitor 27 will be described in detail.

It is not favorable for the observer to compare between two or more specimens from the macroimages of one definite type described in the third embodiment. Also, while a change with time over the specimen is being inspected, the microimage recorded at the beginning may be different from that at the current time.

This embodiment is intended for explaining a method of displaying a group of the microimages appropriate for the comparison. The procedure of comparing different specimens is explained below.

When the observer is viewing the specimen through an objective lens of a desired magnification and wants to replace the specimen with another, he or she can press the microimage pickup switch of the third embodiment so that the light path selector 20 switches the light path to the macroimage optical axis which extends off the objective lens 10 before saving the current microimage.

The memory 36 for saving the microimage produced by photo-to-electric conversion of the image sensor 35 can hold a desired number of images. It is assumed that the microimages of five different specimens are saved as shown in FIG. 21.

Denoted by H in FIG. 21 is a macroimage of the current specimen S which is displayed by a macroimage display command signal from the CPU 30.

The CPU 30 compares a newly received macroimage with the macroimages saved in the memory 36 and upon judging that they are identical in the shape, color, brightness, and other factors, erases it as is followed by sending the macroimage display command signal to the memory 36.

When it is judged that the newly received microimage is different from the saved microimages, the microimage display command signal for displaying the newly received microimage is applied to the memory 36.

Similar to the third embodiment, the CPU 30 then determines the location and size of a target K in the macroimage, shown in FIG. 21, for displaying as a realtime image on the monitor and transfers their data to the memory 36.

The CPU 30 also delivers a data signal indicative of the magnification of the objective lens 10. to the memory 36.

This is followed by the optical path selector 20 selecting the realtime image optical axis across the objective lens 10, similar to the third embodiment. The objective lens 10 mounted on the revolver 9 can be changed to a desired magnification for optimum observation.

Then, the monitor 27 displays the realtime image processed by the image processor 26 as shown in FIG. 22. In the tenth embodiment, the CPU 30 is constantly supplied with a stage position signal from the stage displacement detectors 28 and 29 as well as the objective lens magnification signal. When the stage 7 is displaced or the objective lens magnification is changed, the above action with the memory 36 is repeated.

The tenth embodiment is not limited to the comparison between a group of specimens S but applicable to the inspection of a change with time of one specimen S. In the latter, the microimage saved in the memory 36 is continuously updated, and a macroimage display command signal and a blank which represents the location and size of a realtime image are displayed in the latest macroimage.

Accordingly, the observer can see the realtime image determined by the objective lens 10, its location and size in the corresponding macroimage, and the other macroimages saved in the past on the same screen of the monitor 27 together with data of the magnification of the objective lens 10.

This allows the comparison of the specimens S one from another to be carried out efficiently without repeating the loading of the specimen S. Also, a change with time of the specimen S can successfully be observed at a higher efficiency on the monitor.

Similar to the third embodiment, the enlarged image and its location and size in a reference image of the specimen S are displayed at a time on the monitor without being interrupted by the traditional drawbacks of BI. Hence, while the stage is moved at a minimum frequency, it is easily judged that the specimen which definitely stays in a field of view is out of focus when its image fails to be displayed. The microscope observation will thus be conducted readily and efficiently.

The number of specimens, the microimage, the size and location of the objective lens magnification display, and the number of the microimages are not limited to those in the tenth embodiment but they may freely be determined depending on applicable requirements.

In this embodiment where the optical axis in the optical system from the light source to the focusing unit is vertical and horizontal to the floor, the advantage produced with the third embodiment may be obtained with equal success.

Although the information about the objective lens 10 only is given and used in the embodiment, other data such as a mode of the microscope observation, an intensity of the illumination light, and presence or absence of the other optical elements may duly be collected with sensors and/or external input devices and displayed on the monitor.

This embodiment is intended for overcoming the disadvantages of any monitor-aided microscope which is identical in the substantial construction to the prior art microscope.

In the prior art, both the low and high magnification optical systems extend across the objective lens and are heavily affected by the magnification and the number of fields of view of the objective lens. When the objective lens of a high magnification is used, an image produced with the low magnification optical system is associated with the high magnification as its light has been passed through the objective lens of the high magnification, although the location of an image produced with the high magnification optical system is successfully identified in the image produced with the low magnification optical system. It is thus difficult to identify the location within the entirety of the specimen.

Also, two sets of the monitors are provided and viewed alternately. This will hardly relieve the fatigue of the observer but require a considerable extension of the working area.

Instead, the tenth embodiment of the present invention allows the monitor to display at a time an enlarged image of the specimen produced from the magnification of the objective lens and an overall image. (a macroimage) of the specimen produced at a lower magnification without the objective lens. Since the location and size of the enlarged image is expressed in the macroimage on the display, the observer can acknowledge the location and size of a target to be observed within the overall image of the specimen from the screen of the monitor. In addition, a mode of the microscope observation and a data about the objective lens can be displayed at the same time on the monitor hence allowing instant perception of the observer.

In other words, the tenth embodiment provides an improved monitor-aided microscope which eliminates the disadvantages of a conventional observation with BI and allows the observer to comfortably carry out the observation through viewing the monitor.

As set forth above, the monitor-aided microscope according to the present invention is simplified in the observation and the operation, improved in the space saving, and prevented from cost up.

More specifically, according to the first aspect of the present invention, the microscope body is decreased in the overall height enough to carry the monitor on the upper or rear side thereof or its adjacent location. This allows the observer to operate the microscope while viewing the monitor substantially without shifting the direction of the eyes.

According to the second aspect of the present invention, the first optical system and the second optical system are selectively used. As the macroimage observation is conducted with its optical system, no arrangement of an extra macrolens is needed. Since the field of view become wider than that of a conventional low magnification objective lens, the specimen of a considerable size can successfully be viewed throughout its size. Also, both the high magnification observation and the low magnification or macroimage observation are carried out in one single assembly of the microscope, hence requiring no need of an extra macroimage observation device and allowing the target to be observed at a higher magnification to be easily pointed out in the entirety of the specimen.

According to the third aspect of the present invention, the macroimage and the microimage are displayed at the same time on the monitor. This allows the observer to identify an enlarged part of the specimen, its location in the specimen, and the current data of the microscope specifications on the same screen of the monitor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
a stage on which a specimen is placed;
a light source for illuminating the specimen;
an objective lens for passing an illumination light from the specimen;
an image formation system for forming an optical image of the specimen;
a monitor for displaying as a visible picture the optical image of the specimen obtained from the image formation system; and
an observation condition switching means for switching an observation condition for the specimen from one observation condition to another observation condition, wherein an optical axis extending from the light source to the image formation system is horizontal over a floor, various controls constituting the observation condition switching means are mounted intensively on one side of a main body of the microscope, and the monitor is placed above the optical axis, and wherein the observation condition switching means switches between a first mode for high magnification observation of the specimen with the objective lens and a second mode for low magnification observation with no use of the objective lens.

2. A microscope according to claim 1, wherein a frame of the microscope is used as a monitor mounting table on which the monitor is placed.

3. A microscope according to claim 2, further comprising a height adjusting mechanism for controlling a height of the monitor mounting table.

4. A microscope according to claim 1, further comprising a focusing handle for focusing an image of the specimen, the focusing handle constituting the observation condition switching means and being mounted on one side of the main body of the microscope.

5. A microscope according to claim 1, wherein the various controls include at least two of a filter selector switch, a field-of-view control dial, an aperture dial, an exposure control dial, and a stage operating knob.

6. A microscope comprising:
a stage on which a specimen is placed;
a light source for illuminating the specimen;
an objective lens for passing an illumination light from the specimen;
an image formation system for forming an optical image of the specimen;
a monitor for displaying as a visible picture the optical image of the specimen obtained from the image formation system; and
an observation condition switching means for switching an observation condition for the specimen from one observation condition to another observation condition, wherein the observation condition switching means switches between a first mode for high magnification observation of the specimen with the objective lens and a second mode for low magnification observation with no use of the objective lens.

7. A microscope according to claim 6, wherein when the second mode is selected, the objective lens is retracted from an optical path so that the optical image of the specimen is transmitted to the image formation system along an optical path which is different from that of the first mode.

8. A microscope according to claim 7, wherein the objective lens is mounted on a revolver which is retracted from the optical path when the second mode is selected.

9. A microscope according to claim 7, wherein the objective lens is mounted on a revolver which has a specific aperture provided therein and, when the second mode is selected, the revolver is rotated so that the optical path extends across its aperture.

10. A microscope according to claim 9, wherein the aperture of the revolver is greater in size than an aperture of the objective lens mounting.

11. A microscope according to claim 6, wherein when the second mode is selected, the objective lens is retracted from an optical path and a corresponding focusing lens is moved to and set across the optical path.

12. A microscope according to claim 6, wherein when the second mode is selected, the objective lens is retracted from an optical path and a corresponding focusing lens through which the optical image of the specimen is passed is moved and set.

13. A microscope according to claim 12, wherein the focusing lens is moved along an optical axis.

14. A microscope according to claim 6, wherein when the second mode is selected, the stage is moved until the specimen is located across an optical path which is different from that of the first mode.

15. A microscope comprising:

a stage on which a specimen is placed;

a light source for illuminating the specimen;

an objective lens for passing an illumination light from the specimen;

an image formation system for forming an optical image of the specimen;

a monitor for displaying as a visible picture the optical image of the specimen obtained from the image formation system;

an observation condition switching means for switching an observation condition for the specimen from one observation condition to another observation condition, wherein the observation condition switching means switches between a first mode for high magnification observation of the specimen with the objective lens and a second mode for low magnification observation with no use of the objective lens; and control means which controls the monitor to simultaneously display on its screen a macroimage obtained in the first mode and a microimage obtained in the second mode.

16. A microscope according to claim 15, wherein said control means includes means for controlling the monitor to display in the macroimage a frame which represents a location and a size of the microimage within the macroimage.

17. A microscope according to claim 15, wherein said control means includes means for controlling the monitor to display data indicative of an observation condition, together with the macroimage and microimage.

18. A microscope according to claim 15, wherein said control means include means for controlling the monitor to display an image of the specimen previously obtained, together with the macroimage and microimage.

19. A microscope comprising:

a stage on which a specimen is placed;

a light source for illuminating the specimen;

an objective lens for passing an illumination light from the specimen;

an image formation system for forming an optical image of the specimen;

a monitor for displaying as a visible picture the optical image of the specimen obtained from the image formation system; and an observation condition switching means for switching an observation condition for the specimen from one observation condition to another observation condition, wherein an optical axis extending from the light source to the image formation system is horizontal over a floor and the monitor is placed above the optical axis, and wherein the observation condition switching means switches between a first mode for high magnification observation of the specimen with the objective lens and a second mode for low magnification observation with no use of the objective lens.

* * * * *